United States Patent
Pelegrin et al.

(10) Patent No.: US 12,441,788 B2
(45) Date of Patent: Oct. 14, 2025

(54) ANTI-MÜLLERIAN INHIBITING SUBSTANCE ANTIBODIES AND USES THEREOF

(71) Applicants: INSERM (Institut National de la Santé et de la Recherche Médicale), Paris (FR); INSTITUT RÉGIONAL DU CANCER DE MONTPELLIER, Montpellier (FR); UNIVERSITÉ DE MONTPELLIER, Montpellier (FR); SORBONNE UNIVERSITÉ, Paris (FR)

(72) Inventors: André Pelegrin, Montpellier (FR); Bruno Robert, Montpellier (FR); Pierre Martineau, Montpellier (FR); Maëva Chauvin, Montpellier (FR); Myriam Chentouf, Montpellier (FR); Nathalie Di Clemente-Besse, Paris (FR)

(73) Assignees: INSERM (INSTITUT NATIONAL DE LA SANTE ET DE LA RECHERCHE MEDICALE), Paris (FR); INSTITUT REGIONAL DU CANCER DE MONTPELLIER, Montpellier (FR); UNIVERSITE DE MONTPELLIER, Montpellier (FR); SORBONNE UNIVERSITE, Paris (FR)

( * ) Notice: Subject to any disclaimer, the term of this patent is extended or adjusted under 35 U.S.C. 154(b) by 846 days.

(21) Appl. No.: 17/763,746

(22) PCT Filed: Sep. 25, 2020

(86) PCT No.: PCT/EP2020/076947
§ 371 (c)(1),
(2) Date: Mar. 25, 2022

(87) PCT Pub. No.: WO2021/058763
PCT Pub. Date: Apr. 1, 2021

(65) Prior Publication Data
US 2022/0324962 A1 Oct. 13, 2022

(30) Foreign Application Priority Data

Sep. 27, 2019 (EP) .................................. 19306213

(51) Int. Cl.
*C07K 16/26* (2006.01)
*A61P 35/00* (2006.01)

(52) U.S. Cl.
CPC .............. *C07K 16/26* (2013.01); *A61P 35/00* (2018.01); *C07K 2317/21* (2013.01); *C07K 2317/622* (2013.01); *C07K 2317/73* (2013.01)

(58) Field of Classification Search
CPC ................ C07K 16/26; C07K 2317/21; C07K 2317/622; C07K 2317/73; A61P 35/00
See application file for complete search history.

(56) References Cited

FOREIGN PATENT DOCUMENTS

| EP | 2 161 579 A1 | 3/2010 |
|---|---|---|
| WO | 2017/207694 A1 | 12/2017 |

OTHER PUBLICATIONS

Josso et al.; "Anti-Müllerian hormone and its receptors"; Molecular and cellular Endocrinology, 2001, pp. 25-32.

*Primary Examiner* — Aurora M Fontainhas
*Assistant Examiner* — Selam Berhane
(74) *Attorney, Agent, or Firm* — WCF IP

(57) ABSTRACT

In ovarian carcinoma, Müllerian Inhibiting Substance (MIS) type II receptor (MISRII) and the MIS/MISRII signaling pathway are potential therapeutic targets. Conversely, the role of the three MIS type I receptors (MISRI; ALK2, ALK3 and ALK6) in this cancer needs to be clarified. Using four ovarian cancer cell lines and ovarian cancer cells isolated from patients' tumor ascites, the inventors found that ALK2 and ALK3 are the two main MISRIs involved in MIS signaling at low and high MIS concentrations, respectively. Moreover, high MIS concentrations were associated with apoptosis and decreased clonogenic survival, whereas low MIS concentrations improved cancer cell viability. Finally, the inventors showed that anti-MIS antibody B10 inhibited MIS pro-survival effect. These last results open the way to (Continued)

Figure 1:
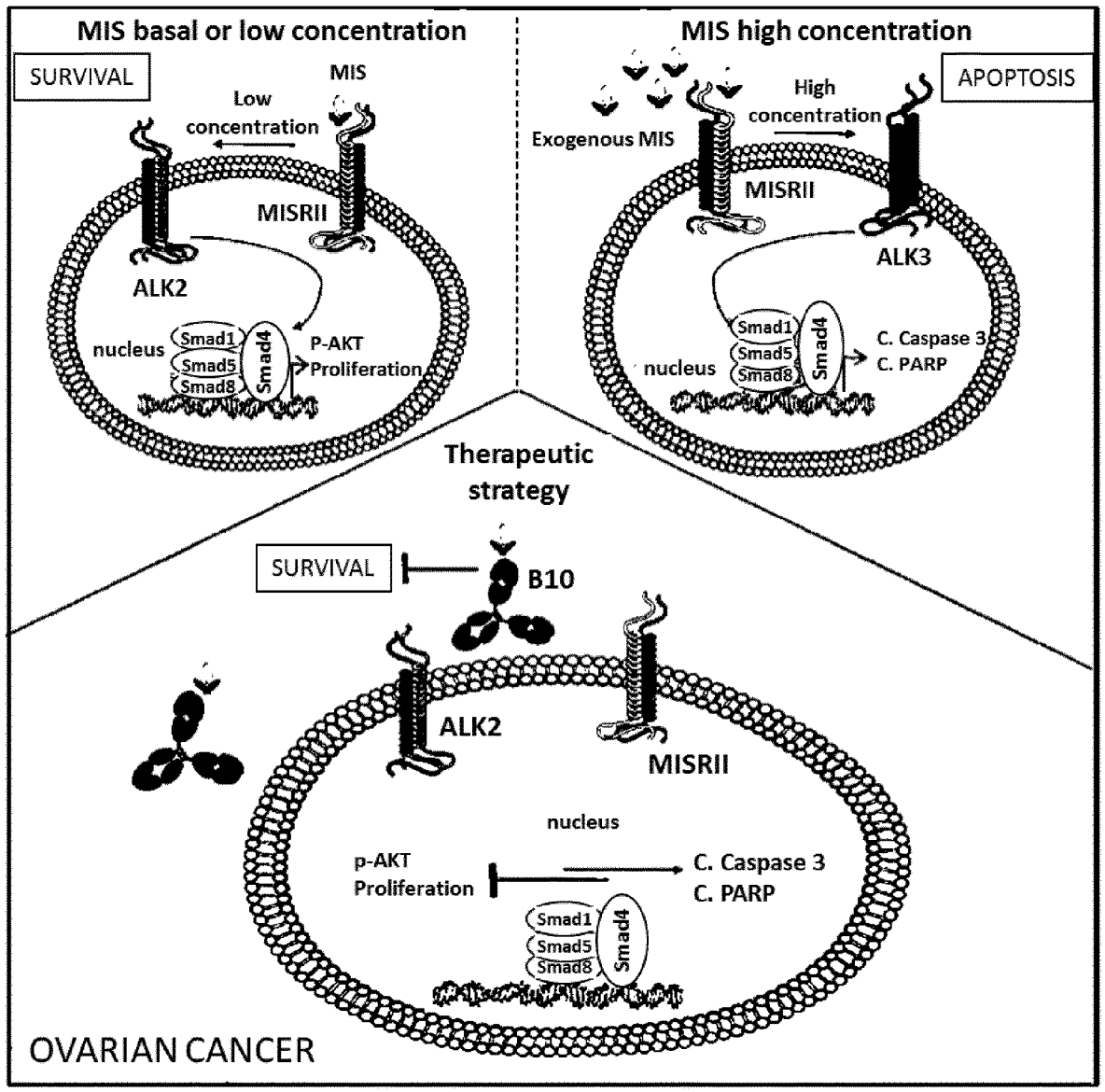

an innovative therapeutic approach to suppress MIS proliferative effect, instead of administering high doses of MIS to induce cancer cell apoptosis.

12 Claims, 5 Drawing Sheets

Specification includes a Sequence Listing.

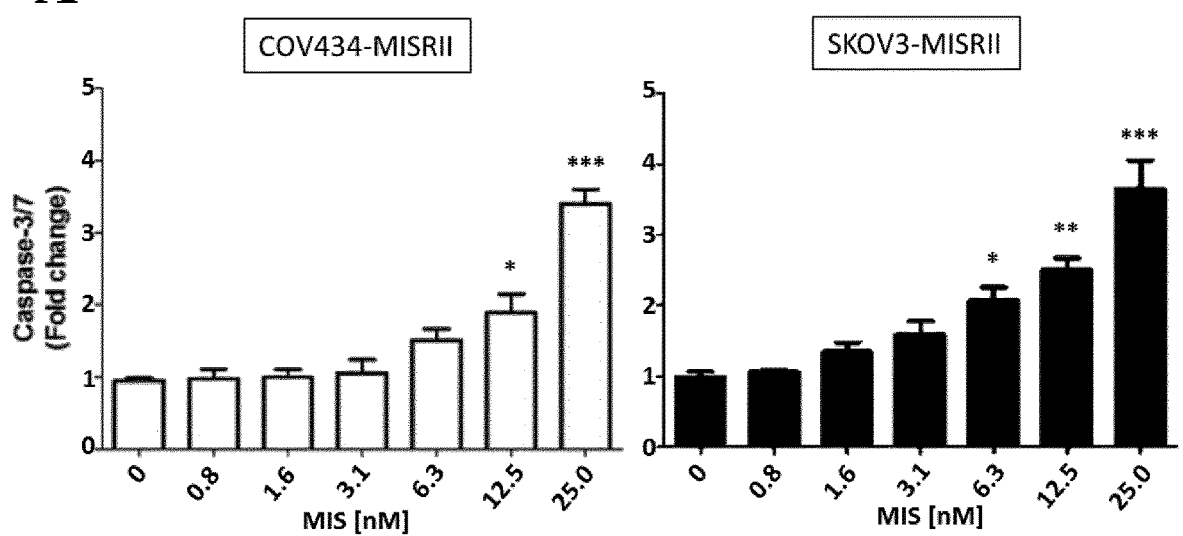
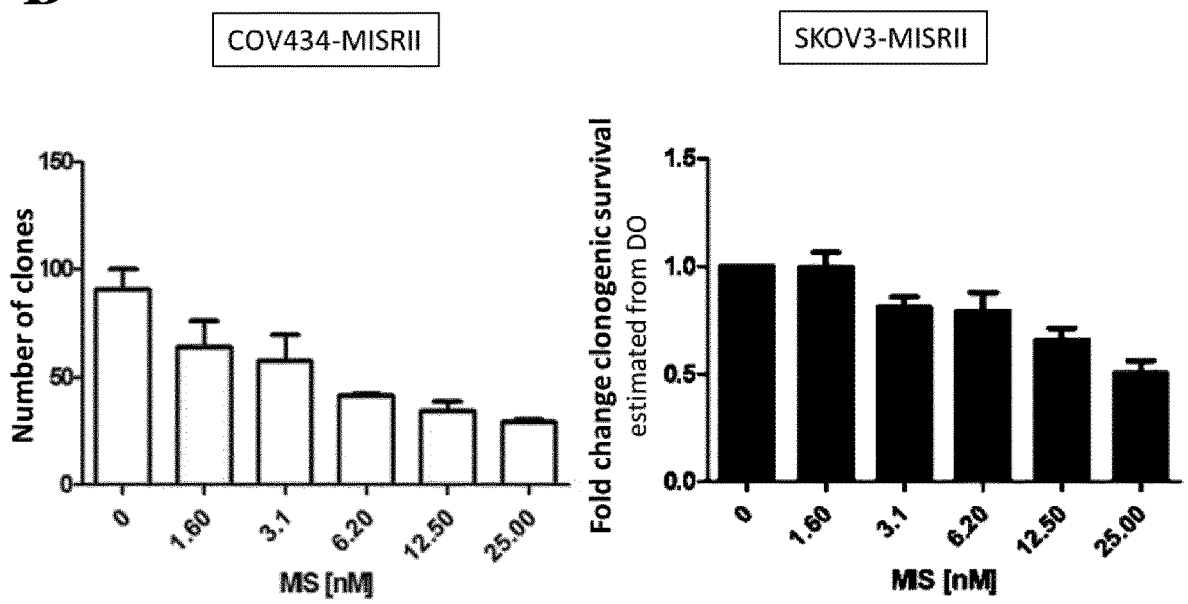
Figure 2 A and B

A
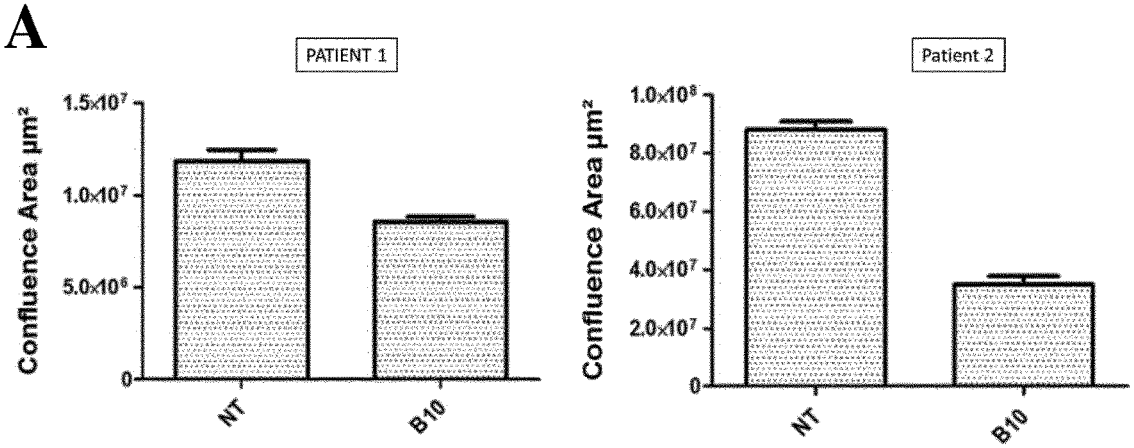
Figure 5A
B
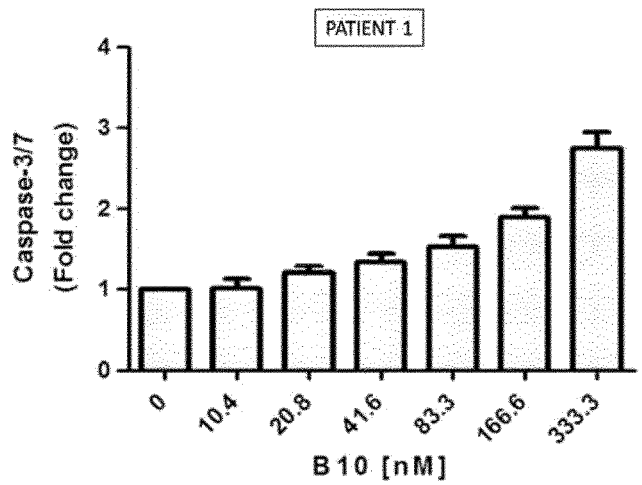
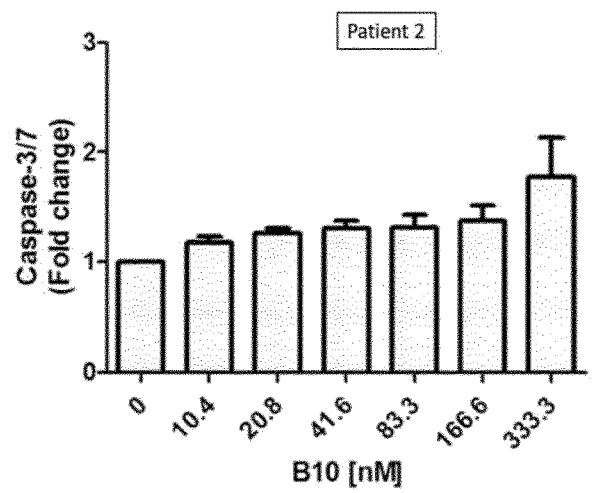
Figure 5B

ANTI-MÜLLERIAN INHIBITING SUBSTANCE ANTIBODIES AND USES THEREOF

FIELD OF THE INVENTION

The present invention relates to an anti-müllerian inhibiting substance (MIS) antibodies and its uses in the treatment of MIS or MISRII positive cancer, and more particular of gynecological cancer, lung cancer or colorectal cancer in a subject in need thereof.

BACKGROUND OF THE INVENTION

Müllerian Inhibiting Substance (MIS) is a member of the TGFβ family, and acts by binding to its specific receptor (MIS type II receptor; MISRII) that recruits type I receptors (MISRI: ALK2, ALK3 and ALK6). MISRI phosphorylation induces SMAD 1/5/8 phosphorylation and their migration into the nucleus where through SMAD4, they regulate different responsive genes, depending on the target tissue (di Clemente et al., 2010; Josso and Clemente, 2003). Preclinical in vitro and in vivo findings as well as data from clinical samples (Bakkum-Gamez et al., 2008; Masiakos et al., 1999; Meirelles et al., 2012; Pepin et al., 2015; Renaud et al., 2005; Wei et al., 2010) have demonstrated that MISRII and the MIS/MISRII signaling pathway are potential therapeutic targets in gynecological tumors, and particularly in ovarian carcinoma (reviewed in (Kim et al., 2014)). This signaling cascade could be targeted using recombinant MIS or anti-MISRII antibodies. However, the use of recombinant MIS has been hampered by the difficulties linked to the production of sufficient amounts of bioactive MIS and to its delivery at the tumor site (Donahoe et al., 2003). Recently, Pepin et al. described an original production strategy and an alternative delivery approach using gene therapy (not yet in clinical phase) (Pepin et al., 2013, 2015). Among anti-MISRII antibodies (Salhi et al., 2004) and antibody fragments (Yuan et al., 2006, 2008), the monoclonal antibody (MAb) 12G4 and its humanized version have been extensively evaluated in preclinical studies (Bougherara et al., 2017; Estupina et al., 2017; Gill et al., 2017; Kersual et al., 2014), and the humanized antibody (GM-102 or murlentamab) is now tested in clinical trials (NCT02978755, NCT03799731). The mechanism of action of the glyco-engineered murlentamab involves antibody-dependent cell-mediated cytotoxicity and antibody-dependent cell phagocytosis, but almost no apoptosis, suggesting that the effect is not directly related to the MIS signaling pathway (Bougherara et al., 2017; Estupina et al., 2017). Indeed, in MISRII-positive cancer cells, MIS inhibits proliferation and induces apoptosis.

To understand why the MIS signaling pathway is not implicated in the mechanisms of action of this anti-MISRII MAb, the inventors analyzed the role of the three MISRI (ALK2, ALK3 and ALK6) in ovarian carcinoma cell lines and carcinoma cells isolated from ascites samples of patients with ovarian carcinoma. Indeed, although ALK2, ALK3 and ALK6 roles in several cell types have been studied during development and in other physiological conditions (Belville et al., 2005; Clarke et al., 2001; Josso et al., 1998; Orvis et al., 2008; Sèdes et al., 2013; Visser et al., 2001; Zhan et al., 2006), few data are available in cancer. Basal et al. demonstrated that MISRII, ALK2, ALK3 and ALK6 are expressed in epithelial ovarian cancer (immunohistochemistry analysis of 262 samples), but did not assess their specific role (Basal et al., 2016).

Herein, the inventors found that ALK2 and ALK3 are the two main MISRI used for MIS signaling in four ovarian cancer cell lines (derived from two epithelial ovarian tumors and from two sex cord-stromal tumors, including one granulosa cell tumor), and that they have a differential role according to MIS concentration. They then showed that cancer cell viability promotion by MIS at low concentration (below 0.5 to 13 nM) can be inhibited using MIS siRNAs and the new anti-MIS antibody B10. This observation opens the way to an innovative therapeutic approach to suppress MIS proliferative effect, instead of administering high doses of MIS to induce apoptosis.

SUMMARY OF THE INVENTION

In ovarian carcinoma, Müllerian Inhibiting Substance (MIS) type II receptor (MISRII) and the MIS/MISRII signaling pathway are potential therapeutic targets. Using four ovarian cancer cell lines and ovarian cancer cells isolated from patients' tumor ascites, the inventors found that ALK2 and ALK3 are the two main MISRIs involved in MIS signaling at low and high MIS concentrations, respectively. Moreover, high MIS concentrations were associated with apoptosis and decreased clonogenic survival, whereas low MIS concentrations improved cancer cell viability. Finally, the inventors showed that MIS siRNA and the anti-MIS antibody B10 inhibited MIS pro-survival effect. These last results open the way to an innovative therapeutic approach to suppress MIS proliferative effect, instead of administering high doses of MIS to induce cancer cell apoptosis.

Thus the present invention relates to an anti-müllerian inhibiting substance (MIS) antibodies and its uses in the treatment of MIS or MISRII positive cancer in a subject in need thereof. More particularly, the invention is defined by its claims.

DETAILED DESCRIPTION OF THE INVENTION

Definition

As used herein, the term "müllerian inhibiting substance" or "MIS", also known as "anti-müllerian hormone" or "AMH", has its general meaning in the art and refers to a glycoprotein hormone structurally related to inhibin and activin from the transforming growth factor beta (TGFβ) superfamily, whose key roles in growth differentiation and folliculogenesis. MIS is a 140 kDa dimeric glycoprotein that is encoded by AMH gene on human chromosome 19p13.3. Its entrez reference is 268 and its Uniprot reference is P03971. The MIS acts by binding to its specific MIS type II receptor (MISRII or AMHR2) that recruits type I receptor (MISRI or AMHR1).

As used herein, the term "müllerian inhibiting substance type II receptor" or "MISRII", also known as "AMHR2" has its general meaning in the art. The MISRII is encoded by the AMHR2 gene on human chromosome 12q13.13. Its entrez reference is 269 and its Uniprot reference is Q16671.

As used herein, the term "müllerian inhibiting substance type I receptor" or 'MISRI" also known as "AMHR1" has its general meaning in the art. ALK2, ALK3 and ALK6 are the three variants of MISRI. The phosphorylation of MISRI induces SMAD 1/5/8 phosphorylation and regulate through SMAD4 different responsive gene, depending on the target tissue.

As used herein, the term "ALK2" for "activing receptor-like kinase 2", also known as "activing A receptor type I", has its general meaning in the art and refers to a protein encoded by the ACVR1 gene on human chromosome 2q24.1. Its entrez reference is 90 and its Uniprot reference is Q04771.

As used herein, the tem "ALK3" also known as "activing receptor-like kinase 3", also known as "bone morphogenetic protein receptor type 1A" (BMPR-1A), has its general meaning in the art and refers to a protein encoded by the BMPR1A gene on human chromosome 10q23.2. Its entrez reference is 657 and its Uniprot reference is P36894.

As used herein, the term "ALK6" for "activing receptor-like kinase 6", also known as "bone morphogenetic protein receptor type-1B", has its general meaning in the art and refers to a protein encoded by the BMPR1B gene on human chromosome 4q22.3. Its entrez reference is 658 and its Uniprot reference is 000238.

As used herein the term "antibody" or "immunoglobulin" have the same meaning, and will be used equally in the present invention. The term "antibody" as used herein refers to immunoglobulin molecules and immunologically active portions of immunoglobulin molecules, i.e., molecules that contain an antigen binding site that immunospecifically binds an antigen. As such, the term antibody encompasses not only whole antibody molecules, but also antibody fragments as well as variants (including derivatives) of antibodies and antibody fragments. In natural antibodies, two heavy chains are linked to each other by disulfide bonds and each heavy chain is linked to a light chain by a disulfide bond. There are two types of light chain, lambda (l) and kappa (κ). There are five main heavy chain classes (or isotypes) which determine the functional activity of an antibody molecule: IgM, IgD, IgG, IgA and IgE. Each chain contains distinct sequence domains. The light chain includes two domains, a variable domain (VL) and a constant domain (CL). The heavy chain includes four domains, a variable domain (VH) and three constant domains (CHI, CH2 and CH3, collectively referred to as CH). The variable regions of both light (VL) and heavy (VH) chains determine binding recognition and specificity to the antigen. The constant region domains of the light (CL) and heavy (CH) chains confer important biological properties such as antibody chain association, secretion, trans-placental mobility, complement binding, and binding to Fc receptors (FcR). The Fv fragment is the N-terminal part of the Fab fragment of an immunoglobulin and consists of the variable portions of one light chain and one heavy chain. The specificity of the antibody resides in the structural complementarity between the antibody combining site and the antigenic determinant. Antibody combining sites are made up of residues that are primarily from the hypervariable or complementarity determining regions (CDRs). Occasionally, residues from nonhypervariable or framework regions (FR) can participate to the antibody binding site or influence the overall domain structure and hence the combining site. Complementarity Determining Regions or CDRs refer to amino acid sequences which together define the binding affinity and specificity of the natural Fv region of a native immunoglobulin binding site. The light and heavy chains of an immunoglobulin each have three CDRs, designated L-CDR1, L-CDR2, L-CDR3 and H-CDR1, H-CDR2, H-CDR3, respectively. An antigen-binding site, therefore, typically includes six CDRs, comprising the CDR set from each of a heavy and a light chain V region. Framework Regions (FRs) refer to amino acid sequences interposed between CDRs.

In the context of the invention, the amino acid residues of the antibody of the invention are numbered according to the IMGT numbering system. The IMGT unique numbering has been defined to compare the variable domains whatever the antigen receptor, the chain type, or the species (Lefranc M.-P., "Unique database numbering system for immunogenetic analysis" Immunology Today, 18, 509 (1997); Lefranc M.-P., "The IMGT unique numbering for Immunoglobulins, T cell receptors and Ig-like domains" The Immunologist, 7, 132-136 (1999); Lefranc, M.-P., Pommié, C., Ruiz, M., Giudicelli, V., Foulquier, E., Truong, L., Thouvenin-Contet, V. and Lefranc, G., "IMGT unique numbering for immunoglobulin and T cell receptor variable domains and Ig superfamily V-like domains" Dev. Comp. Immunol., 27, 55-77 (2003).). In the IMGT unique numbering, the conserved amino acids always have the same position, for instance cysteine 23, tryptophan 41, hydrophobic amino acid 89, cysteine 104, phenylalanine or tryptophan 118. The IMGT unique numbering provides a standardized delimitation of the framework regions (FR1-IMGT: positions 1 to 26, FR2-IMGT: 39 to 55, FR3-IMGT: 66 to 104 and FR4-IMGT: 118 to 128) and of the complementarity determining regions: CDR1-IMGT: 27 to 38, CDR2-IMGT: 56 to 65 and CDR3-IMGT: 105 to 117. If the CDR3-IMGT length is less than 13 amino acids, gaps are created from the top of the loop, in the following order 111, 112, 110, 113, 109, 114, etc. If the CDR3-IMGT length is more than 13 amino acids, additional positions are created between positions 111 and 112 at the top of the CDR3-IMGT loop in the following order 112.1, 111.1, 112.2, 111.2, 112.3, 111.3, etc. (imgt.org/IMGTScientificChart/Nomenclature/IMGT-FRCDRdefinition.html)

As used herein, the term "amino acid sequence" has its general meaning and is a sequence of amino acids that confers to a protein its primary structure. According to the invention, the amino acid sequence may be modified with one, two or three conservative amino acid substitutions, without appreciable loss of interactive binding capacity. By "conservative amino acid substitution", it is meant that an amino acid can be replaced with another amino acid having a similar side chain. Families of amino acid having similar side chains have been defined in the art, including basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., glycine, cysteine, alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine).

According to the invention a first amino acid sequence having at least 70% of identity with a second amino acid sequence means that the first sequence has 70; 71; 72; 73; 74; 75; 76; 77; 78; 79; 80; 81; 82; 83; 84; 85; 86; 87; 88; 89; 90; 91; 92; 93; 94; 95; 96; 97; 98; or 99% of identity with the second amino acid sequence. Amino acid sequence identity is typically determined using a suitable sequence alignment algorithm and default parameters, such as BLAST P (Karlin and Altschul, 1990).

According to the meaning of the present invention, the "identity" is calculated by comparing two aligned sequences in a comparison window. The sequence alignment allows determining the number of positions (nucleotides or amino acids) in common for the two sequences in the comparison window. The number of positions in common is therefore divided by the total number of positions in the comparison window and multiplied by 100 to obtain the identity percentage. The determination of the identity percentage of sequence can be made manually or thanks to well-known computer programs.

As used herein, the terms "purified" and "isolated" relate to the antibodies or polypeptides of the invention and mean that the antibodies or polypeptides is present in the substantial absence of other biologic macromolecules of the same type. The term "purified" as used here means preferably that at least 75% in weight, more preferably at least 85% in weight, even more preferably at least 95% in weight, and the more preferably at least 98% in weight of antibody, compared to the total weight of macromolecules present.

As used herein, the term "specificity" refers to the ability of an antibody to detectably bind an epitope presented on an antigen, such as MIS, while having relatively little detectable reactivity with non-MIS proteins. Specificity can be relatively determined by binding or competitive binding assays, using, e.g., Biacore instruments, as described elsewhere herein. Specificity can be exhibited by, e.g., an about 10:1, about 20:1, about 50:1, about 100:1, 10.000:1 or greater ratio of affinity/avidity in binding to the specific antigen versus nonspecific binding to other irrelevant molecules (in this case the specific antigen is MIS).

The term "affinity", as used herein, means the strength of the binding of an antibody to an epitope. The affinity of an antibody is given by the dissociation constant Kd, defined as [Ab]×[Ag]/[Ab–Ag], where [Ab–Ag] is the molar concentration of the antibody-antigen complex, [Ab] is the molar concentration of the unbound antibody and [Ag] is the molar concentration of the unbound antigen. The affinity constant Ka is defined by 1/Kd. Preferred methods for determining the affinity of mAbs can be found in Harlow, et al., Antibodies: A Laboratory Manual, Cold Spring Harbor Laboratory Press, Cold Spring Harbor, N.Y., 1988), Coligan et al., eds., Current Protocols in Immunology, Greene Publishing Assoc. and Wiley Interscience, N.Y., (1992, 1993), and Muller, Meth. Enzymol. 92:589-601 (1983), which references are entirely incorporated herein by reference. One preferred and standard method well known in the art for determining the affinity of mAbs is the use of Biacore instruments.

As used herein, the terms "monoclonal antibody", "monoclonal Ab", "monoclonal antibody composition", "mAb", or the like, as used herein refer to a preparation of antibody molecules of single molecular composition. A monoclonal antibody composition displays a single binding specificity and affinity for a particular epitope.

As used herein, the term "nucleic acid molecule" has its general meaning in the art and refers to a DNA or RNA molecule.

Antibodies

The sequences of interest in the present application are indicated in the following Table 1:

| Name | SEQ ID NO: | SEQUENCE |
|---|---|---|
| B10 VH-CDR1 | 1 | GFTFSNYN |
| B10 native VH-CDR2 | 2 | INGSSRSI |
| B10 derivative VH-CDR2 | 3 | INGASRSI |
| B10 VH-CDR3 | 4 | VRSSYYGGGMDV |
| B10 VL-CDR1 | 5 | SSDVGGYNY |

-continued

| Name | SEQ ID NO: | SEQUENCE |
|---|---|---|
| B10 VL-CDR2 | 6 | YDS |
| B10 VL-CDR3 | 7 | SSYTDYSTRV |
| B10 native VH | 8 | EVQLVESGGSLVKPGGSLRLSCAASGFTFSN YNMNWVRQAPGKGLEWISDINGSSRSIYYAD FVKGRFTISRDNATNSLYLQMNSLRAEDTAV YYCVRSSYYGGGMDVWGRGTLVTVSS |
| B10 derivative VH | 9 | EVQLVESGGSLVKPGGSLRLSCAASGFTFSN VRQAPGKGLEWISDINGASRSIYYADFVKGR FTISRDNAKNSLYLQMNSLRAEDTAVYYCVR SSYYGGGMDVWGRGTLVTVSS |
| B10 VL | 10 | QSVLTQPASVSGSPGQSITISCAGTSSDVGG YNYVSWYQQHPGKAPKLMIYYDSYRPSGVSN RFSGSKSGNTASLTISGLQAEDEADYYCSSY TDYSTRVFGGGTKLAVLG |

A first aspect of the present invention relates to an anti-müllerian inhibiting substance (MIS) antibodies, particularly in a purified form or isolated form.

Therefore, the inventors relates to an isolated anti-müllerian inhibiting substance (MIS) antibody comprising:
(a) a heavy chain wherein the variable domain comprises a H-CDR1 having a sequence set forth as SEQ ID NO:1; a H-CDR2 having a sequence set forth as SEQ ID NO:2 or SEQ ID NO:3; a H-CDR3 having a sequence set forth as SEQ ID NO:4; and
(b) a light chain wherein the variable domain comprises a L-CDR1 having a sequence set forth as SEQ ID NO:5; a L-CDR2 having a sequence set forth as SEQ ID NO:6; a L-CDR3 having a sequence set forth as SEQ ID NO:7 ("B 10 derivative").

The present invention thus provides antibodies comprising functional variants of the VL region, VH region, or one or more CDRs of B10. A functional variant of a VL, VH, or CDR used in the context of a monoclonal antibody of the present invention still allows the antibody to retain at least a substantial proportion (at least about 50%, 60%, 70%, 80%, 90%, 95% or more) of the affinity/avidity and/or the specificity/selectivity of the parent antibody (i.e. B10 antibody) and in some cases such a monoclonal antibody of the present invention may be associated with greater affinity, selectivity and/or specificity than the parent Ab. Such variants can be obtained by a number of affinity maturation protocols including mutating the CDRs (Yang et al., J. Mol. Biol., 254, 392-403, 1995), chain shuffling (Marks et al., Bio/Technology, 10, 779-783, 1992), use of mutator strains of E. coli (Low et al., J. Mol. Biol., 250, 359-368, 1996), DNA shuffling (Patten et al., Curr. Opin. Biotechnol., 8, 724-733, 1997), phage display (Thompson et al., J. Mol. Biol., 256, 77-88, 1996) and sexual PCR (Crameri et al., Nature, 391, 288-291, 1998). Vaughan et al. (supra) discusses these methods of affinity maturation. Such functional variants typically retain significant sequence identity to the parent Ab. The sequence of CDR variants may differ from the sequence of the CDR of the parent antibody sequences through mostly conservative substitutions; for instance at least about 35%, about 50% or more, about 60% or more, about 70% or more, about 75% or more about 80% or more, about 85% or more, about 90% or more, (e.g., about 65-95%, such as about 92%, 93% or 94%) of the substitutions in the variant are conservative amino acid residue replacements. The sequences of CDR variants may differ from the sequence of the CDRs of the parent antibody sequences through mostly conservative substitutions; for instance at least 10, such as at least 9, 8, 7, 6, 5, 4, 3, 2 or 1 of the substitutions in the variant are conservative amino acid residue replacements. In the context of the present invention, conservative substitutions may be defined by substitutions within the classes of amino acids reflected as follows:

Aliphatic residues I, L, V, and M
Cycloalkenyl-associated residues F, H, W, and Y
Hydrophobic residues A, C, F, G, H, I, L, M, R, T, V, W, and Y
Negatively charged residues D and E
Polar residues C, D, E, H, K, N, Q, R, S, and T
Positively charged residues H, K, and R
Small residues A, C, D, G, N, P, S, T, and V
Very small residues A, G, and S
Residues involved in turn A, C, D, E, G, H, K, N, Q, R, S, P, and formation T
Flexible residues Q, T, K, S, G, P, D, E, and R More conservative substitutions groupings include: valine-leucine-isoleucine, phenylalanine-tyrosine, lysine-arginine, alanine-valine, and asparagine-glutamine. Conservation in terms of hydropathic/hydrophilic properties and residue weight/size also is substantially retained in a variant CDR as compared to a CDR of B10. The importance of the hydropathic amino acid index in conferring interactive biologic function on a protein is generally understood in the art. It is accepted that the relative hydropathic character of the amino acid contributes to the secondary structure of the resultant protein, which in turn defines the interaction of the protein with other molecules, for example, enzymes, substrates, receptors, DNA, antibodies, antigens, and the like. Each amino acid has been assigned a hydropathic index on the basis of their hydrophobicity and charge characteristics these are: isoleucine (+4.5); valine (+4.2); leucine (+3.8); phenylalanine (+2.8); cysteine/cystine (+2.5); methionine (+1.9); alanine (+1.8); glycine (−0.4); threonine (−0.7); serine (−0.8); tryptophane (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5). The retention of similar residues may also or alternatively be measured by a similarity score, as determined by use of a BLAST program (e.g., BLAST 2.2.8 available through the NCBI using standard settings BLOSUM62, Open Gap=1 1 and Extended Gap=1). Suitable variants typically exhibit at least about 70% of identity to the parent peptide.

Thus, in some embodiment, the isolated anti-MIS antibody comprises:
(a) a variable heavy chain having at least 70% identity with a sequence set forth as SEQ ID NO:8 or SEQ ID NO:9; and
(b) a variable light chain having at least 70% identity with a sequence set forth as SEQ ID NO:10.

In some embodiment, the isolated anti-MIS antibody comprises:
(a) a variable heavy chain having at least 70% identity with a sequence set forth as SEQ ID NO:8 wherein the variable domain comprises a VH-CDR1 having a sequence set forth as SEQ ID NO:1; a VH-CDR2 having a sequence set forth as SEQ ID NO:2; a VH-CDR3 having a sequence set forth as SEQ ID NO:4; and
(b) a variable light chain having at least 70% identity with a sequence set forth as SEQ ID NO:10 wherein the variable domain comprises a VL-CDR1 having a sequence set forth as SEQ ID NO:5; a VL-CDR2 having a sequence set forth as SEQ ID NO:6; a VL-CDR3 having a sequence set forth as SEQ ID NO:7 ("B10 native").

In some embodiment, the isolated anti-MIS antibody comprises:
(c) a variable heavy chain having at least 70% identity with a sequence set forth as SEQ ID NO:9 wherein the variable domain comprises a VH-CDR1 having a sequence set forth as SEQ ID NO:1; a VH-CDR2 having a sequence set forth as SEQ ID NO:3; a VH-CDR3 having a sequence set forth as SEQ ID NO:4; and
(d) a variable light chain having at least 70% identity with a sequence set forth as SEQ ID NO:10 wherein the variable domain comprises a VL-CDR1 having a sequence set forth as SEQ ID NO:5; a VL-CDR2 having a sequence set forth as SEQ ID NO:6; a VL-CDR3 having a sequence set forth as SEQ ID NO:7 ("B10 derivative").

In some embodiment, the isolated anti-MIS antibody comprises a variable heavy chain having a sequence set forth as SEQ ID NO:8: and a variable light chain having a sequence set forth as SEQ ID NO:10 ("B10 native").

In some embodiment, the isolated anti-MIS antibody comprises a variable heavy chain having a sequence set forth as SEQ ID NO:9: and a variable light chain having a sequence set forth as SEQ ID NO:10 ("B10 derivative").

In some embodiment, the isolated anti-MIS antibody blocks the recruiting of MIS type I receptor MISRI (i.e ALK2, ALK3 or ALK6) by the complex MISRII/MIS.

The antibodies of the present invention are produced by any technique known in the art, such as, without limitation, any chemical, biological, genetic or enzymatic technique, either alone or in combination. Typically, knowing the amino acid sequence of the desired sequence, one skilled in the art can readily produce said antibodies, by standard techniques for production of polypeptides. For instance, they can be synthesized using well-known solid phase method, preferably using a commercially available peptide synthesis apparatus (such as that made by Applied Biosystems, Foster City, California) and following the manufacturer's instructions. Alternatively, antibodies of the present invention can be synthesized by recombinant DNA techniques well-known in the art. For example, antibodies can be obtained as DNA expression products after incorporation of DNA sequences encoding the antibodies into expression vectors and introduction of such vectors into suitable eukaryotic or prokaryotic hosts that will express the desired antibodies, from which they can be later isolated using well-known techniques.

In some embodiment, the antibody of the invention is a monoclonal antibody.

In another embodiment, the monoclonal antibody of the invention is a humanized antibody. In particular, in said humanized antibody, the variable domain comprises human acceptor frameworks regions, and optionally human constant domain where present, and non-human donor CDRs, such as mouse CDRs.

According to the invention, the term "humanized antibody" refers to an antibody having variable region framework and constant regions from a human antibody but retains the CDRs of a previous non-human antibody.

The humanized antibody of the present invention may be produced by obtaining nucleic acid sequences encoding CDR domains, as previously described, constructing a humanized antibody expression vector by inserting them into an expression vector for animal cell having genes encoding (i) a heavy chain constant region identical to that of a human antibody and (ii) a light chain constant region identical to that of a human antibody, and expressing the genes by introducing the expression vector into an animal cell. The humanized antibody expression vector may be either of a type in which a gene encoding an antibody heavy chain and a gene encoding an antibody light chain exists on separate vectors or of a type in which both genes exist on the same vector (tandem type). In respect of easiness of construction of a humanized antibody expression vector, easiness of introduction into animal cells, and balance between the expression levels of antibody H and L chains in animal cells, humanized antibody expression vector of the tandem type is preferred. Examples of tandem type humanized antibody expression vector include pKANTEX93 (WO 97/10354), pEE18 and the like. Methods for producing humanized antibodies based on conventional recombinant DNA and gene transfection techniques are well known in the art (See, e. g., Riechmann L. et al. 1988; Neuberger M S. et al. 1985). Antibodies can be humanized using a variety of techniques known in the art including, for example, CDR-grafting (EP 239,400; PCT publication WO91/09967; U.S. Pat. Nos. 5,225,539; 5,530,101; and 5,585,089), veneering or resurfacing (EP 592,106; EP 519,596; Padlan E A (1991); Studnicka G M et al. (1994); Roguska M A. et al. (1994)), and chain shuffling (U.S. Pat. No. 5,565,332). The general recombinant DNA technology for preparation of such antibodies is also known (see European Patent Application EP 125023 and International Patent Application WO 96/02576).

In some embodiments the monoclonal antibody of the invention is a human antibody.

As used herein the term "human antibody is intended to include antibodies having variable and constant regions derived from human immunoglobulin sequences. The human antibodies of the present invention may include amino acid residues not encoded by human immunoglobulin sequences (e.g., mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences.

Human antibodies can be produced using various techniques known in the art. Human antibodies are described generally in van Dijk and van de Winkel, cur. Opin. Pharmacol. 5; 368-74 (2001) and lonberg, cur. Opin. Immunol. 20; 450-459 (2008). Human antibodies may be prepared by administering an immunogen to a transgenic animal that has been modified to produce intact human antibodies or intact antibodies with human variable regions in response to antigenic challenge. Such animals typically contain all or a portion of the human immunoglobulin loci, or which are present extrachromosomally or integrated randomly into the animal's chromosomes. In such transgenic mice, the endogenous immunoglobulin loci have generally been inactivated. For review of methods for obtaining human antibodies from transgenic animals, see Lonberg, Nat. Biotech. 23; 1117-1125 (2005). See also, e.g., U.S. Pat. Nos. 6,075,181 and 6,150,584 describing XENOMOUSE™ technology; U.S. Pat. No. 5,770,429 describing HUMAB® technology; U.S. Pat. No. 7,041,870 describing K-M MOUSE® technology, and U.S. Patent Application publication No. US 2007/0061900, describing VELOCIMOUSE® technology. Human variable regions from intact antibodies generated by such animals may be further modified, e.g., by combining with a different human constant region Human antibodies can also be made by hybridoma-based methods. Human myeloma and mouse-human heteromyeloma cell lines for the production of human monoclonal antibodies have been described. (See, e.g., Kozbor J. Immunol., 13: 3001 (1984); Brodeur et al., Monoclonal Antibody Production Techniques and Applications, pp. 51-63 (Marcel Dekker, Inc., New York, 1987); and Boerner et al., J. Immunol., 147: 86(1991).) Human antibodies generated via human B-cell hybridoma technology are also described in Li et al., Proc. Natl. Acad. Sci. USA, 103:3557-3562 (2006). Additional methods include those described, for example, in U.S. Pat. No. 7,189,826 (describing production of monoclonal human igM antibodies from hybridoma cell lines) and Ni, Xiandai Mianyixue, 26(4):265-268 (2006) (describing human-human hybridomas). Human hybridoma technology (Trioma technology) is also described in Vollmers and Brandlein, Histology and Histopathology, 20(3):927-937 (2005) and Vollmers and Brandlein, Methods and Findings in Experimental and Clinical Pharmacology, 27(3):185-91 (2005). Fully human antibodies can also be derived from phage-display libraries (as disclosed in Hoogenboom et al., 1991, J. Mol. Biol. 227:381; and Marks et al., 1991, J. Mol. Biol. 222:581). Phage display techniques mimic immune selection through the display of antibody repertoires on the surface of filamentous bacteriophage, and subsequent selection of phage by their binding to an antigen of choice. One such technique is described in PCT publication No. WO 99/10494. Human antibodies described herein can also be prepared using SCID mice into which human immune cells have been reconstituted such that a human antibody response can be generated upon immunization. Such mice are described in, for example, U.S. Pat. Nos. 5,476,996 and 5,698,767 to Wilson et al.

In one embodiment, the antibody of the invention is an antigen biding fragment selected from the group consisting of a Fab, a F(ab)'2, a single domain antibody, a ScFv, a Sc(Fv)2, a diabody, a triabody, a tetrabody, an unibody, a minibody, a maxibody, a small modular immunopharmaceutical (SMIP), minimal recognition units consisting of the amino acid residues that mimic the hypervariable region of an antibody as an isolated complementary determining region (CDR), and fragments which comprise or consist of: the VL as well as amino acid sequence having at least 70% of identity with sequence selected from the group consisting of SEQ ID NO:7, SEQ ID NO:16, SEQ ID NO:25 and SEQ ID NO:34; or the VH chains as well as amino acid sequence having at least 70% of identity with sequence selected from the group consisting of SEQ ID NO:8, SEQ ID NO:17, SEQ ID NO:26 and SEQ ID NO:35.

The term "antigen binding fragment" of an antibody, as used herein, refers to one or more fragments of an intact antibody that retain the ability to specifically binds to a given antigen (e.g., MIS). Antigen biding functions of an antibody can be performed by fragments of an intact antibody. Examples of biding fragments encompassed within the term antigen biding fragment of an antibody include a Fab fragment, a monovalent fragment consisting of the VL, VH, CL and CH1 domains; a Fab' fragment, a monovalent fragment consisting of the VL, VH, CL, CH1 domains and hinge region; a F(ab')2 fragment, a bivalent fragment comprising two Fab' fragments linked by a disulfide bridge at the hinge region; an Fd fragment consisting of VH domains of a single arm of an antibody; a single domain antibody (sdAb) fragment (Ward et al., 1989 Nature 341:544-546), which consists of a VH domain or a VL domain; and an isolated complementary determining region (CDR). Furthermore, although the two domains of the Fv fragment, VL and VH, are coded for by separate genes, they can be joined, using recombinant methods, by an artificial peptide linker that enables them to be made as a single protein chain in which the VL and VH regions pair to form monovalent molecules (known as single chain Fv (ScFv); see, e.g., Bird et al., 1989 Science 242:423-426; and Huston et al., 1988 proc. Natl. Acad. Sci. 85:5879-5883). "dsFv" is a VH::VL heterodimer stabilised by a disulfide bond. Divalent and multivalent antibody fragments can form either spontaneously by association of monovalent scFvs, or can be generated by coupling monovalent scFvs by a peptide linker, such as divalent sc(Fv)2. Such single chain antibodies include one or more antigen biding portions or fragments of an antibody. These antibody fragments are obtained using conventional techniques known to those skilled in the art, and the fragments are screened for utility in the same manner as are intact antibodies. An unibody is another type of antibody fragment lacking the hinge region of IgG4 antibodies. The deletion of the hinge region results in a molecule that is essentially half the size of traditional IgG4 antibodies and has a univalent binding region rather than the bivalent biding region of IgG4 antibodies. Antigen binding fragments can be incorporated into single domain antibodies, SMIP, maxibodies, minibodies, intrabodies, diabodies, triabodies and tetrabodies (see, e.g., Hollinger and Hudson, 2005, Nature Biotechnology, 23, 9, 1126-1136). The term "diabodies" "tribodies" or "tetrabodies" refers to small antibody fragments with multivalent antigen-binding sites (2, 3 or four), which fragments comprise a heavy-chain variable domain (VH) connected to a light-chain variable domain (VL) in the same polypeptide chain (VH-VL). By using a linker that is too short to allow pairing between the two domains on the same chain, the domains are forced to pair with the complementary domains of another chain and create two antigen-binding sites. Antigen biding fragments can be incorporated into single chain molecules comprising a pair of tandem Fv segments (VH-CH1-VH—CH1) Which, together with complementary light chain polypeptides, form a pair of antigen binding regions (Zapata et al., 1995 Protein Eng. 8(10); 1057-1062 and U.S. Pat. No. 5,641,870).

The Fab of the present invention can be obtained by treating an antibody which specifically reacts with MIS with a protease, papaine. Also, the Fab can be produced by inserting DNA encoding Fab of the antibody into a vector for prokaryotic expression system, or for eukaryotic expression system, and introducing the vector into a procaryote or eucaryote (as appropriate) to express the Fab.

The F(ab')2 of the present invention can be obtained treating an antibody which specifically reacts with MIS with a protease, pepsin. Also, the F(ab')2 can be produced by binding Fab' described below via a thioether bond or a disulfide bond.

The Fab' of the present invention can be obtained treating F(ab')2 which specifically reacts with MIS with a reducing agent, dithiothreitol. Also, the Fab' can be produced by inserting DNA encoding Fab' fragment of the antibody into an expression vector for prokaryote, or an expression vector for eukaryote, and introducing the vector into a prokaryote or eukaryote (as appropriate) to perform its expression.

The scFv of the present invention can be produced by obtaining cDNA encoding the VH and VL domains as previously described, constructing DNA encoding scFv, inserting the DNA into an expression vector for prokaryote, or an expression vector for eukaryote, and then introducing the expression vector into a prokaryote or eukaryote (as appropriate) to express the scFv. To generate a humanized scFv fragment, a well known technology called CDR grafting may be used, which involves selecting the complementary determining regions (CDRs) from a donor scFv fragment, and grafting them onto a human scFv fragment framework of known three dimensional structure (see, e. g., WO98/45322; WO 87/02671; U.S. Pat. Nos. 5,859,205; 5,585,089; 4,816,567; EP0173494).

Domain Antibodies (dAbs) are the smallest functional binding units of antibodies—molecular weight approximately 13 kDa—and correspond to the variable regions of either the heavy (VH) or light (VL) chains of antibodies. Further details on domain antibodies and methods of their production are found in U.S. Pat. Nos. 6,291,158; 6,582,915; 6,593,081; 6,172,197; and 6,696,245; US 2004/0110941; EP 1433846, 0368684 and 0616640; WO 2005/035572, 2004/101790, 2004/081026, 2004/058821, 2004/003019 and 2003/002609, each of which is herein incorporated by reference in its entirety.

UniBodies are another antibody fragment technology, based upon the removal of the hinge region of IgG4 antibodies. The deletion of the hinge region results in a molecule that is essentially half the size of a traditional IgG4 antibody and has a univalent binding region rather than a bivalent binding region. Furthermore, because UniBodies are about smaller, they may show better distribution over larger solid tumors with potentially advantageous efficacy. Further details on UniBodies may be obtained by reference to WO 2007/059782, which is incorporated by reference in its entirety.

The antibody of the present invention may be of any isotype. The choice of isotype typically will be guided by the desired effector functions, such as ADCC induction. Exemplary isotypes are IgG1, IgG2, IgG3, and IgG4. Either of the human light chain constant regions, kappa or lambda, may be used. If desired, the class of a monoclonal antibody of the present invention may be switched by known methods. Typical, class switching techniques may be used to convert one IgG subclass to another, for instance from IgG1 to IgG2. Thus, the effector function of the human monoclonal antibodies of the present invention may be changed by isotype switching to, e.g., an IgG1, IgG2, IgG3, IgG4, IgD, IgA, IgE, or IgM antibody for various therapeutic uses.

In some embodiments, the antibody of the present invention is a full-length antibody.

In some embodiments, the full-length antibody is an IgG1 antibody.

In some embodiments, the full-length antibody is an IgG4 antibody.

In some embodiments, the IgG4 antibody is a stabilized IgG4 antibody. Examples of suitable stabilized IgG4 antibodies are antibodies wherein arginine at position 409 in a heavy chain constant region of human IgG4, which is indicated in the EU index as in Kabat et al. supra, is substituted with lysine, threonine, methionine, or leucine, preferably lysine (described in WO2006033386) and/or wherein the hinge region comprises a Cys-Pro-Pro-Cys sequence. Other suitable stabilized IgG4 antibodies are disclosed in WO2008145142, which is hereby incorporated by reference in its entirety.

In some embodiments, the monoclonal antibody of the present invention is an antibody of a non-IgG4 type, e.g. IgG1, IgG2 or IgG3 which has been mutated such that the ability to mediate effector functions, such as ADCC, has been reduced or even eliminated. Such mutations have e.g.

been described in Dall'Acqua W F et al., J Immunol. 177(2): 1129-1138 (2006) and Hezareh M, J Virol. 75(24): 12161-12168 (2001).

A further aspect to the invention refers to a cross-competing antibody which cross-competes for binding MIS with the antibody of the invention.

As used herein, the term "binding" in the context of the binding of an antibody to a predetermined antigen or epitope typically is a binding with an affinity corresponding to a KD of about 10-7 M or less, such as about 10-8 M or less, such as about 10-9 M or less, about 10-10 M or less, or about 10-11 M or even less when determined by for instance surface plasmon resonance (SPR) technology in a BIAcore 3000 instrument using a soluble form of the antigen as the ligand and the antibody as the analyte or vice versa. Other methods such as Scatchard plot using radioactive antibody or MIS, or ELISA can be used to determine this affinity or to evaluate it by an EC50. BIACORE® (GE Healthcare, Piscaataway, NJ) is one of a variety of surface plasmon resonance assay formats that are routinely used to epitope bin panels of monoclonal antibodies. Typically, an antibody binds to the predetermined antigen with an affinity corresponding to a KD that is at least ten-fold lower, such as at least 100-fold lower, for instance at least 1,000-fold lower, such as at least 10,000-fold lower, for instance at least 100,000-fold lower than its KD for binding to a non-specific antigen (e.g., BSA, casein), which is not identical or closely related to the predetermined antigen. When the KD of the antibody is very low (that is, the antibody has a high affinity), then the KD with which it binds the antigen is typically at least 10,000-fold lower than its KD for a non-specific antigen. An antibody is said to essentially not bind an antigen or epitope if such binding is either not detectable (using, for example, plasmon resonance (SPR) technology in a BIAcore 3000 instrument using a soluble form of the antigen as the ligand and the antibody as the analyte), or is 100 fold, 500 fold, 1000 fold or more than 1000 fold less than the binding detected by that antibody and an antigen or epitope having a different chemical structure or amino acid sequence.

The antibodies of the invention may be assayed for specific binding by any method known in the art. Many different competitive binding assay format(s) can be used for epitope binding. The immunoassays which can be used include, but are not limited to, competitive assay systems using techniques such western blots, radioimmunoassays, ELISA, "sandwich" immunoassays, immunoprecipitation assays, precipitin assays, gel diffusion precipitin assays, immunoradiometric assays, fluorescent immunoassays, protein A immunoassays, and complement-fixation assays. Such assays are routine and well known in the art (see, e.g., Ausubel et al., eds, 1994 Current Protocols in Molecular Biology, Vol. 1, John Wiley & sons, Inc., New York).

Additional antibodies can be identified based on their ability to cross-compete (e.g., to competitively inhibit the binding of, in a statistically significant manner) with other antibodies of the invention in standard MIS binding assays. The ability of a test antibody to inhibit the binding of antibodies of the present invention to MIS demonstrates that the test antibody can compete with that antibody for binding to MIS; such an antibody may, according to non-limiting theory, bind to the same or a related (e.g., a structurally similar or spatially proximal) epitope on MIS as the antibody with which it competes. Thus, another aspect of the invention provides antibodies that bind to the same antigen as, and compete with, the antibodies disclosed herein. As used herein, an antibody "competes" for binding when the competing antibody inhibits MIS binding of an antibody or antigen binding fragment of the invention by more than 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99% in the presence of an equimolar concentration of competing antibody.

In other embodiments the antibodies or antigen binding fragments of the invention bind to one or more epitopes of MIS. In some embodiments, the epitopes to which the present antibodies or antigen binding fragments bind are linear epitopes. In other embodiments, the epitopes to which the present antibodies or antigen binding fragments bind are non-linear, conformational epitopes.

In some embodiment, the cross-competing antibody of the present invention cross-competes for binding MIS with the antibody comprising:
  (a) a heavy chain wherein the variable domain comprises a VH-CDR1 having a sequence set forth as SEQ ID NO:1; a VH-CDR2 having a sequence set forth as SEQ ID NO:2 or SEQ ID NO:3; a VH-CDR3 having a sequence set forth as SEQ ID NO:4; and
  (b) a light chain wherein the variable domain comprises a VL-CDR1 having a sequence set forth as SEQ ID NO:5; a VL-CDR2 having a sequence set forth as SEQ ID NO:6; a VL-CDR3 having a sequence set forth as SEQ ID NO:7.

In some embodiment, the cross-competing antibody of the present invention cross-competes for binding MIS with the antibody comprising a variable heavy chain having a sequence set forth as SEQ ID NO:8 or SEQ ID NO:9; and a variable light chain having a sequence set forth as SEQ ID NO:10.

In some embodiment, the cross-competing antibody of the present invention retain the activity of the anti-MIS antibody comprising a variable heavy chain having a sequence set forth as SEQ ID NO:8 or SEQ ID NO:9; and a variable light chain having a sequence set forth as SEQ ID NO:10.

Engineered antibodies of the invention include those in which modifications have been made to framework residues within VH and/or VL, e.g. to improve the properties of the antibody. Typically such framework modifications are made to decrease the immunogenicity of the antibody. For example, one approach is to "backmutate" one or more framework residues to the corresponding germline sequence. More specifically, an antibody that has undergone somatic mutation may contain framework residues that differ from the germline sequence from which the antibody is derived. Such residues can be identified by comparing the antibody framework sequences to the germline sequences from which the antibody is derived. To return the framework region sequences to their germline configuration, the somatic mutations can be "backmutated" to the germline sequence by, for example, site-directed mutagenesis or PCR-mediated mutagenesis. Such "backmutated" antibodies are also intended to be encompassed by the invention. Another type of framework modification involves mutating one or more residues within the framework region, or even within one or more CDR regions, to remove T cell-epitopes to thereby reduce the potential immunogenicity of the antibody. This approach is also referred to as "deimmunization" and is described in further detail in U.S. Patent Publication No. 20030153043 by Carr et al.

In some embodiments, the glycosylation of an antibody is modified. Glycosylation can be altered to, for example, increase the affinity of the antibody for the antigen. Such carbohydrate modifications can be accomplished by, for example, altering one or more sites of glycosylation within the antibody sequence. For example, one or more amino acid substitutions can be made that result in elimination of one or more variable region framework glycosylation sites to thereby eliminate glycosylation at that site. Such aglycosylation may increase the affinity of the antibody for antigen. Such an approach is described in further detail in U.S. Pat. Nos. 5,714,350 and 6,350,861 by Co et al.

In some embodiments, some mutations are made to the amino acids localized in aggregation "hotspots" within and near the first CDR (CDR1) to decrease the antibodies susceptibility to aggregation (see Joseph M. Perchiacca et al., Proteins 2011; 79:2637-2647).

In another embodiment, the antibody is modified to increase its biological half-life. Various approaches are possible. For example, one or more of the following mutations can be introduced: T252L, T254S, T256F, as described in U.S. Pat. No. 6,277,375 by Ward. Alternatively, to increase the biological half life, the antibody can be altered within the CH1 or CL region to contain a salvage receptor binding epitope taken from two loops of a CH2 domain of an Fc region of an IgG, as described in U.S. Pat. Nos. 5,869,046 and 6,121,022 by Presta et al. Antibodies with increased half lives and improved binding to the neonatal Fc receptor (FcRn), which is responsible for the transfer of maternal IgGs to the foetus (Guyer et al., J. Immunol. 117:587 (1976) and Kim et al., J. immunol. 24:249 (1994)), are described in US2005/0014934A1 (Hinton et al.). Those antibodies comprise an Fc region with one or more substitutions therein which improve binding of the Fc region to FcRn. Such Fc variants include those with substitutions at one or more of Fc region residues: 238, 256, 265, 272, 286, 303, 305, 307, 311,312, 317, 340, 356, 360, 362, 376, 378, 380, 382, 413, 424, or 434, e.g., substitutions of Fc region residue 434 (U.S. Pat. No. 7,371,826).

Another modification of the antibodies herein that is contemplated by the invention is pegylation. An antibody can be pegylated to, for example, increase the biological (e.g., serum) half-life of the antibody. To pegylate an antibody, the antibody, or fragment thereof, typically is reacted with polyethylene glycol (PEG), such as a reactive ester or aldehyde derivative of PEG, under conditions in which one or more PEG groups become attached to the antibody or antibody fragment. The pegylation can be carried out by an acylation reaction or an alkylation reaction with a reactive PEG molecule (or an analogous reactive water-soluble polymer). As used herein, the term "polyethylene glycol" is intended to encompass any of the forms of PEG that have been used to derivatize other proteins, such as mono (C1-C10) alkoxy- or aryloxy-polyethylene glycol or polyethylene glycol-maleimide. In certain embodiments, the antibody to be pegylated is an aglycosylated antibody. Methods for pegylating proteins are known in the art and can be applied to the antibodies of the invention. See for example, EP0154316 by Nishimura et al. and EP0401384 by Ishikawa et al.

Another modification of the antibodies that is contemplated by the invention is a conjugate or a protein fusion of at least the antigen-binding region of the antibody of the invention to serum protein, such as human serum albumin or a fragment thereof to increase half-life of the resulting molecule. Such approach is for example described in Ballance et al. EP0322094. Another possibility is a fusion of at least the antigen-binding region of the antibody of the invention to proteins capable of binding to serum proteins, such human serum albumin to increase half-life of the resulting molecule. Such approach is for example described in Nygren et al., EP 0 486 525.

Polysialytion is another technology, which uses the natural polymer polysialic acid (PSA) to prolong the active life and improve the stability of therapeutic peptides and proteins. PSA is a polymer of sialic acid (a sugar). When used for protein and therapeutic peptide drug delivery, polysialic acid provides a protective microenvironment on conjugation. This increases the active life of the therapeutic protein in the circulation and prevents it from being recognized by the immune system. The PSA polymer is naturally found in the human body. It was adopted by certain bacteria which evolved over millions of years to coat their walls with it. These naturally polysialylated bacteria were then able, by virtue of molecular mimicry, to foil the body's defense system. PSA, nature's ultimate stealth technology, can be easily produced from such bacteria in large quantities and with predetermined physical characteristics. Bacterial PSA is completely non-immunogenic, even when coupled to proteins, as it is chemically identical to PSA in the human body.

Another technology includes the use of hydroxyethyl starch ("HES") derivatives linked to antibodies. HES is a modified natural polymer derived from waxy maize starch and can be metabolized by the body's enzymes. HES solutions are usually administered to substitute deficient blood volume and to improve the rheological properties of the blood. Hesylation of an antibody enables the prolongation of the circulation half-life by increasing the stability of the molecule, as well as by reducing renal clearance, resulting in an increased biological activity. By varying different parameters, such as the molecular weight of HES, a wide range of HES antibody conjugates can be customized.

Nucleic Acids, Vectors, Recombinant Host Cells and Uses Thereof

A further object of the invention relates to a nucleic acid molecule encoding the anti-MIS antibody according to the invention. More particularly the nucleic acid molecule encodes the heavy chain or the light chain of the anti-MIS antibody of the present invention.

Typically, said nucleic acid is a DNA or RNA molecule, which may be included in any suitable vector, such as a plasmid, cosmid, episome, artificial chromosome, phage or a viral vector. As used herein, the terms "vector", "cloning vector" and "expression vector" mean the vehicle by which a DNA or RNA sequence (e.g. a foreign gene) can be introduced into a host cell, so as to transform the host and promote expression (e.g. transcription and translation) of the introduced sequence. So, a further aspect of the invention relates to a vector comprising a nucleic acid of the invention. Such vectors may comprise regulatory elements, such as a promoter, enhancer, terminator and the like, to cause or direct expression of said antibody upon administration to a subject. Examples of promoters and enhancers used in the expression vector for animal cell include early promoter and enhancer of SV40 (Mizukami T. et al. 1987), LTR promoter and enhancer of Moloney mouse leukemia virus (Kuwana Y et al. 1987), promoter (Mason J O et al. 1985) and enhancer (Gillies S D et al. 1983) of immunoglobulin H chain and the like. Any expression vector for animal cell can be used, so long as a gene encoding the human antibody C region can be inserted and expressed. Examples of suitable vectors include pAGE107 (Miyaji H et al. 1990), pAGE103 (Mizukami T et al. 1987), pHSG274 (Brady G et al. 1984), pKCR (O'Hare K et al. 1981), pSG1 beta d2-4-(Miyaji H et al. 1990) and the like. Other examples of plasmids include replicating plasmids comprising an origin of replication, or integrative plasmids, such as for instance pUC, pcDNA, pBR, and the like. Other examples of viral vector include adenoviral, retroviral, herpes virus and AAV vectors. Such recombinant viruses may be produced by techniques known in the art, such as by transfecting packaging cells or by transient transfection with helper plasmids or viruses. Typical examples of virus packaging cells include PA317 cells, PsiCRIP cells, GPenv+ cells, 293 cells, etc. Detailed protocols for producing such replication-defective recombinant viruses may be found for instance in WO 95/14785, WO 96/22378, U.S. Pat. Nos. 5,882,877, 6,013,516, 4,861,719, 5,278,056 and WO 94/19478.

A further aspect of the invention relates to a host cell which has been transfected, infected or transformed by a nucleic acid and/or a vector according to the invention.

A variety of expression vector/host systems may be utilized to contain and express the peptide or protein coding sequence. These include but are not limited to microorganisms such as bacteria transformed with recombinant bacteriophage, plasmid or cosmid DNA expression vectors; yeast transformed with yeast expression vectors (Giga-Hama et al., 1999); insect cell systems infected with virus expression vectors (e.g., baculovirus, see Ghosh et al., 2002); plant cell systems transfected with virus expression vectors (e.g., cauliflower mosaic virus, CaMV; tobacco mosaic virus, TMV) or transformed with bacterial expression vectors (e.g., Ti or pBR322 plasmid; see e.g., Babe et al., 2000); or animal cell systems. Those of skill in the art are aware of various techniques for optimizing mammalian expression of proteins, see e.g., Kaufman, 2000; Colosimo et al., 2000. Mammalian cells that are useful in recombinant protein productions include but are not limited to VERO cells, HeLa cells, Chinese hamster ovary (CHO) cell lines, COS cells (such as COS-7), W138, BHK, HepG2, 3T3, RIN, MDCK, A549, PC12, K562 and 293 cells. Exemplary protocols for the recombinant expression of the peptide substrates or fusion polypeptides in bacteria, yeast and other invertebrates are known to those of skill in the art and a briefly described herein below. Mammalian host systems for the expression of recombinant proteins also are well known to those of skill in the art. Host cell strains may be chosen for a particular ability to process the expressed protein or produce certain post-translation modifications that will be useful in providing protein activity. Such modifications of the polypeptide include, but are not limited to, acetylation, carboxylation, glycosylation, phosphorylation, lipidation and acylation. Post-translational processing which cleaves a "prepro" form of the protein may also be important for correct insertion, folding and/or function. Different host cells such as CHO, HeLa, MDCK, 293, WI38, and the like have specific cellular machinery and characteristic mechanisms for such post-translational activities and may be chosen to ensure the correct modification and processing of the introduced, foreign protein.

In the recombinant production of the antibodies and polypeptides of the invention, it would be necessary to employ vectors comprising polynucleotide molecules for encoding the antibodies and polypeptides of the invention. Methods of preparing such vectors as well as producing host cells transformed with such vectors are well known to those skilled in the art.

The choice of a suitable expression vector for expression of the antibodies of the invention will of course depend upon the specific host cell to be used, and is within the skill of the ordinary artisan. Expression requires that appropriate signals be provided in the vectors, such as enhancers/promoters from both viral and mammalian sources that may be used to drive expression of the nucleic acids of interest in host cells. Usually, the nucleic acid being expressed is under transcriptional control of a promoter. A "promoter" refers to a DNA sequence recognized by the synthetic machinery of the cell, or introduced synthetic machinery, required to initiate the specific transcription of a gene. Nucleotide sequences are operably linked when the regulatory sequence functionally relates to the DNA encoding the protein of interest (e.g., a monoclonal antibody). Thus, a promoter nucleotide sequence is operably linked to a given DNA sequence if the promoter nucleotide sequence directs the transcription of the sequence.

The term "transformation" means the introduction of a "foreign" (i.e. extrinsic or extracellular) gene, DNA or RNA sequence to a host cell, so that the host cell will express the introduced gene or sequence to produce a desired substance, typically a protein or enzyme coded by the introduced gene or sequence. A host cell that receives and expresses introduced DNA or RNA has been "transformed".

The nucleic acids of the invention may be used to produce an antibody of the present invention in a suitable expression system. The term "expression system" means a host cell and compatible vector under suitable conditions, e.g. for the expression of a protein coded for by foreign DNA carried by the vector and introduced to the host cell. Common expression systems include E. coli host cells and plasmid vectors, insect host cells and Baculovirus vectors, and mammalian host cells and vectors. Other examples of host cells include, without limitation, prokaryotic cells (such as bacteria) and eukaryotic cells (such as yeast cells, mammalian cells, insect cells, plant cells, etc.). Specific examples include E. coli, Kluyveromyces or Saccharomyces yeasts, mammalian cell lines (e.g., Vero cells, CHO cells, 3T3 cells, COS cells, etc.) as well as primary or established mammalian cell cultures (e.g., produced from lymphoblasts, fibroblasts, embryonic cells, epithelial cells, nervous cells, adipocytes, etc.). Examples also include mouse SP2/0-Ag14 cell (ATCC CRL1581), mouse P3X63-Ag8.653 cell (ATCC CRL1580), CHO cell in which a dihydrofolate reductase gene (hereinafter referred to as "DHFR gene") is defective (Urlaub G et al; 1980), rat YB2/3HL.P2.G11.16Ag.20 cell (ATCC CRL1662, hereinafter referred to as "YB2/0 cell"), and the like. The present invention also relates to a method of producing a recombinant host cell expressing an antibody according to the invention, said method comprising the steps of: (i) introducing in vitro or ex vivo a recombinant nucleic acid or a vector as described above into a competent host cell, (ii) culturing in vitro or ex vivo the recombinant host cell obtained and (iii), optionally, selecting the cells which express and/or secrete said antibody. Such recombinant host cells can be used for the production of antibodies of the present invention.

Antibodies of the present invention are suitably separated from the culture medium by conventional immunoglobulin purification procedures such as, for example, protein A-Sepharose, hydroxylapatite chromatography, gel electrophoresis, dialysis, or affinity chromatography.

Therapeutic Methods and Uses

The antibodies of the invention are used as inhibitor of MIS. The antibodies of the invention are particularly suitable for the treatment of MIS or MISRII positive cancer.

Thus, the present invention relates to the antibody of the invention for use in the treatment of MIS or MISRII positive cancer.

In other word, the invention relates to a method of treating MIS or MISRII positive cancer in a subject in need thereof.

As used herein, the term "subject" refers to any mammal, such as rodent, a feline, a canine, a primate or human. In some embodiment of the invention, the subject refers to any subject afflicted with or susceptible to be afflicted with MIS or MISRII positive cancer. Particularly, in preferred embodiment, the subject is a human afflicted with or susceptible to be afflicted with gynecological cancer, lung cancer or colorectal cancer.

In some embodiment, the subject is a human afflicted with or susceptible to be afflicted with ovarian cancer.

As used herein, the term "treatment" or "treating" refer to both prophylactic or preventive treatment as well as curative or disease modifying treatment, including treatment of subjects at risk of contracting the disease or suspected to have contracted the disease as well as subjects who are ill or have been diagnosed as suffering from a disease or medical condition, and includes suppression of clinical relapse. The treatment may be administered to a subject having a medical disorder or who ultimately may acquire the disorder, in order to prevent, cure, delay, reduce the severity of, or ameliorate one or more symptoms of a disorder or recurring disorder, or in order to prolong the survival of a subject beyond that expected in the absence of such treatment. By "therapeutic regimen" is meant the pattern of treatment of an illness, e.g., the pattern of dosing used during therapy. A therapeutic regimen may include an induction regimen and a maintenance regimen. The phrase "induction regimen" or "induction period" refers to a therapeutic regimen (or the portion of a therapeutic regimen) that is used for the initial treatment of a disease. The general goal of an induction regimen is to provide a high level of drug to a subject during the initial period of a treatment regimen. An induction regimen may employ (in part or in whole) a "loading regimen", which may include administering a greater dose of the drug than a physician would employ during a maintenance regimen, administering a drug more frequently than a physician would administer the drug during a maintenance regimen, or both. The phrase "maintenance regimen" or "maintenance period" refers to a therapeutic regimen (or the portion of a therapeutic regimen) that is used for the maintenance of a subject during treatment of an illness, e.g., to keep the subject in remission for long periods of time (months or years). A maintenance regimen may employ continuous therapy (e.g., administering a drug at a regular intervals, e.g., weekly, monthly, yearly, etc.) or intermittent therapy (e.g., interrupted treatment, intermittent treatment, treatment at relapse, or treatment upon achievement of a particular predetermined criteria [e.g., pain, disease manifestation, etc.]).

As used herein "the MIS or MISRII positive cancer" refers to cancer which express the MIS. In some embodiment, the MIS or MISRII positive cancer is selected from the group consisting of breast cancer, prostate cancer, lung cancer, colorectal cancer or gynecological cancer (see Kim et al, 2014).

In some embodiment, the MIS or MISRII positive cancer is lung cancer, colorectal cancer or gynecological cancer.

As used herein, the term "lung cancer", also known as "lung carcinoma" includes the well-accepted medical definition that defines lung cancer as a medical condition characterized by uncontrolled cell growth in tissues of the lung. The main types of lung cancer are lung carcinoid tumor, small-cell lung carcinoma (SCLC) and non-small-cell lung carcinoma (NSCLC) such as squamous cell carcinoma, adenocarcinoma, and large cell carcinoma. Additionally, the term "lung cancer" includes all types of lung cancer at all stages of progression. The staging system most often used for lung cancer is the American Joint Committee on Cancer (AJCC) TNM system which is based on the size of the tumor, the spread to nearby lymph nodes and the spread (metastasis) to distant sites.

As used herein, the term "colorectal cancer" or "CRC" includes the well-accepted medical definition that defines colorectal cancer as a medical condition characterized by cancer of cells of the intestinal tract below the small intestine (i.e., the large intestine (colon), including the cecum, ascending colon, transverse colon, descending colon, sigmoid colon, and rectum). Additionally, as used herein, the term "colorectal cancer" also further includes medical conditions, which are characterized by cancer of cells of the duodenum and small intestine (jejunum and ileum). Additionally, the term "colorectal cancer" includes all types of colorectal cancer at all stages of progression. The earliest stage colorectal cancers are called stage 0 (a very early and superficial cancer), and then range from stage I through IV. In stage IV of colorectal cancer, also known as metastatic colorectal, the cancer has spread beyond the colon or rectum to distant organs, such as the liver or lungs. The staging system most often used for CRC is the American Joint Committee on Cancer (AJCC) TNM system which is based on the size of the tumor, the spread to nearby lymph nodes and the spread (metastasis) to distant sites.

As used herein, the term "gynecological cancer" has its general meaning in the art and refers to cancer that develop in woman's reproductive tract. The types of gynecological cancers are cervical cancer, uterine cancer also known as womb cancer or endometrial cancer, ovarian cancer, vaginal cancer, vulvar cancer, primary peritoneal cancer, gestational trophoblastic disease and fallopian tube cancer. Cervical cancer occurs when the cells of the cervix grow abnormally and invade other tissues and organs of the body and include squamous cell carcinoma; adenocarcinoma; adenosquamous carcinoma; small cell carcinoma: neuroendocrine tumor; glassy cell carcinoma; villoglandular adenocarcinoma; cervical melanoma and cervical lymphoma. Uterine refer to any types of cancer which occur in the uterus and include endometrial carcinoma such as endometrial adenocarcinoma, endometrial adenosquamous carcinoma, papillary serous carcinoma, uterine clear-cell carcinoma, mucinous carcinoma of endometrium, mucinous adenocarcinoma of endometrium and endometrial squamous cell carcinoma; transitional cell carcinoma of the endometrium; endometrial stromal sarcomas; malignant mixed müllerian tumors; uterine fibroma; and uterine sarcoma such as uterine carcinosarcoma, uterine adenosarcoma and uterine leiomyosarcomas. Vaginal cancer is a rare cancer occurring in vagina and include vaginal squamous cell carcinoma; vaginal melanoma; and vaginal sarcoma. Vulvar cancer is a type of cancer that occurs on the outer surface area of the female genitalia and include vulvar squamous cell carcinoma; vulvar melanoma; vulvar basal cell carcinoma; Bartholin gland carcinoma; vulvar adenocarcinoma and vulvar sarcoma. Ovarian cancer is a cancer that forms in or on an ovary and include: ovarian epithelial tumors such as ovarian mucinous carcinoma, high-grade serous carcinoma, ovarian endometrioid carcinoma, ovarian clear-cell carcinoma, ovarian low malignant potential tumors and primary peritoneal carcinoma; germ cell tumors such as teratomas, dysgerminoma ovarian germ cell cancer, choriocarcinoma tumors and endodermal sinus tumors; sex-cord stromal tumors such as granulosa cell tumors, granulosa-theca tumors, ovarian fibroma, leydic cell tumors, sertoli cell tumors, sertoli-leydig tumors and gynandroblastoma; ovarian sarcoma such as ovarian carcinosarcomas, ovarian adenosarcomas, ovarian leiomyosarcomas and ovarian fibrosarcomas; krukenberg tumors; and ovarian cysts.

In some embodiment, the MIS or MISRII positive cancer is an ovarian cancer.

As used herein, a "therapeutically effective amount" is intended for a minimal amount of active agent which is necessary to impart therapeutic benefit to a patient. For example, a "therapeutically effective amount of the active agent" to a patient is an amount of the active agent that induces, ameliorates or causes an improvement in the pathological symptoms, disease progression, or physical conditions associated with the disease affecting the patient.

As used herein the terms "administering" or "administration" refer to the act of injecting or otherwise physically delivering a substance as it exists outside the body (e.g. an antibody of the invention) into the subject, such as by mucosal, intradermal, intravenous, subcutaneous, intramuscular delivery and/or any other method of physical delivery described herein or known in the art. When a disease, or a symptom thereof, is being treated, administration of the substance typically occurs after the onset of the disease or symptoms thereof. When a disease or symptoms thereof, are being prevented, administration of the substance typically occurs before the onset of the disease or symptoms thereof.

The antibody of the invention can be administered in combination with a classical treatment of MIS or MISRII positive cancer.

Thus, the invention also refers to i) an anti-müllerian inhibiting substance antibody according to the invention and ii) a classical treatment for use in the treatment of MIS or MISRII positive cancer.

In other word, the invention refers to a method of treating MIS or MISRII positive cancer in a subject in need thereof, comprising administrating to said subject a therapeutically effective amount of an anti-MIS antibody according to the invention and a classical treatment of MIS or MISRII positive cancer.

As used herein, the term "classical treatment" refers to any compound, natural or synthetic, used for the treatment of MIS or MISRII positive cancer.

In a particular embodiment, the classical treatment refers to radiation therapy, immunotherapy or chemotherapy.

According to the invention, compound used for the classical treatment of MIS or MISRII positive cancer may be selected in the group consisting in: EGFR inhibitor such as cetuximab, panitumumab, bevacizumab and ramucirumab; kinase inhibitor such as erlotinib, gefitinib afatinib, regorafenib and larotrectinib; immune checkpoint inhibitor; chemotherapeutic agent and radiotherapeutics agent.

As used herein, the term "chemotherapy" refers to cancer treatment that uses one or more chemotherapeutic agents.

As used herein, the term "chemotherapeutic agent" refers to chemical compounds that are effective in inhibiting tumor growth. Examples of chemotherapeutic agents include alkylating agents such as thiotepa and cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamine; acetogenins (especially bullatacin and bullatacinone); a camptothecin (including the synthetic analogue topotecan and irinotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CBI-TMI); eleutherobin; pancratistatin; a sarcodictyin; spongistatin; nitrogen mustards such as chlorambucil, chlornaphazine, cholophosphamide, estrarnustine, ifosfamide, mechlorethamine, mechlorethamine oxide hydrochloride, melphalan, novembichin, phenesterine, prednimus tine, trofosfamide, uracil mustard; nitrosureas such as carmustine, chlorozotocin, fotemustine, lomustine, nimustine, ranimustine; antibiotics such as the enediyne antibiotics (e.g. calicheamicin, especially calicheamicin (11 and calicheamicin 211, see, e.g., Agnew Chem Intl. Ed. Engl. 33: 183-186 (1994); dynemicin, including dynemicin A; an esperamicin; as well as neocarzinostatin chromophore and related chromoprotein enediyne antibiotic chromomophores), aclacinomysins, actinomycin, authramycin, azaserine, bleomycins, cactinomycin, carabicin, canninomycin, carzinophilin, chromomycins, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idanrbicin, marcellomycin, mitomycins, mycophenolic acid, nogalarnycin, olivomycins, peplomycin, potfiromycin, puromycin, quelamycin, rodorubicin, streptomgrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, trifluridine, tipiracil, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldopospharnide glycoside; aminolevulinic acid; amsacrine; bestrabucil; bisantrene; edatraxate; defo famine; demecolcine; diaziquone; elfornithine; elliptinium acetate; an epothilone; etoglucid; gallium nitrate; hydroxyurea; lentinan; lonidamine; maytansinoids such as maytansine and ansamitocins; mitoguazone; mitoxantrone; mopidamol; nitracrine; pento statin; phenamet; pirarubicin; podophyllinic acid; 2-ethylhydrazide; procarbazine; PSK®; razoxane; rhizoxin; sizofiran; spirogennanium; tenuazonic acid; triaziquone; 2,2',2"-trichlorotriethylarnine; trichothecenes (especially T-2 toxin, verracurin A, roridinA and anguidine); urethan; vindesine; dacarbazine; mannomustine; mitobromtol; mitolactol; pipobroman; gacytosine; arabinoside ("Ara-C"); cyclophosphamide; thiotepa; taxoids, e.g. paclitaxel (TAXOL®, Bristol-Myers Squibb Oncology, Princeton, N.].) and doxetaxel (TAXOTERE®, Rhone-Poulenc Rorer, Antony, France); chlorambucil; gemcitabine; 6-thioguanine; mercaptopurine; methotrexate; platinum analogs such as cisplatin and carboplatin; vinblastine; platinum such as oxaliplatin, cisplatin and carbloplatin; etoposide (VP-16); ifosfamide; mitomycin C; mitoxantrone; vincristine; vinorelbine; navelbine; novantrone; teniposide; daunomycin; aminopterin; xeloda; ibandronate; CPT-11; topoisomerase inhibitor RFS 2000; difluoromethylornithine (DMFO); retinoic acid; capecitabine; ziv-aflibercept; and pharmaceutically acceptable salts, acids or derivatives of any of the above. Also included in this definition are antihormonal agents that act to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY117018, onapristone, and toremifene (Fareston); and anti-androgens such as flutamide, nilutamide, bicalutamide, leuprolide, and goserelin; and pharmaceutically acceptable salts, acids or derivatives of any of the above.

"Pharmaceutically" or "pharmaceutically acceptable" refers to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type As used herein, the term "radiation therapy" has its general meaning in the art and refers the treatment of MIS or MISRII positive cancer with ionizing radiation. Ionizing radiation deposits energy that injures or destroys cells in the area being treated (the target tissue) by damaging their genetic material, making it impossible for these cells to continue to grow. One type of radiation therapy commonly used involves photons, e.g. X-rays. Depending on the amount of energy they possess, the rays can be used to destroy cancer cells on the surface of or deeper in the body. The higher the energy of the x-ray beam, the deeper the x-rays can go into the target tissue. Linear accelerators and betatrons produce x-rays of increasingly greater energy. The use of machines to focus radiation (such as x-rays) on a colorectal cancer site is called external beam radiation therapy. Gamma rays are another form of photons used in radiation therapy. Gamma rays are produced spontaneously as certain elements (such as radium, uranium, and cobalt 60) release radiation as they decompose, or decay. In some embodiments, the radiation therapy is external radiation therapy. Examples of external radiation therapy include, but are not limited to, conventional external beam radiation therapy; three-dimensional conformal radiation therapy (3D-CRT), which delivers shaped beams to closely fit the shape of a tumor from different directions; intensity modulated radiation therapy (IMRT), e.g., helical tomotherapy, which shapes the radiation beams to closely fit the shape of a tumor and also alters the radiation dose according to the shape of the tumor; conformal proton beam radiation therapy; image-guided radiation therapy (IGRT), which combines scanning and radiation technologies to provide real time images of a tumor to guide the radiation treatment; intraoperative radiation therapy (IORT), which delivers radiation directly to a tumor during surgery; stereotactic radiosurgery, which delivers a large, precise radiation dose to a small tumor area in a single session; hyperfractionated radiation therapy, e.g., continuous hyperfractionated accelerated radiation therapy (CHART), in which more than one treatment (fraction) of radiation therapy are given to a subject per day; and hypofractionated radiation therapy, in which larger doses of radiation therapy per fraction is given but fewer fractions.

As used herein, the term "immune checkpoint inhibitor" refers to molecules that totally or partially reduce, inhibit, interfere with or modulate one or more immune checkpoint proteins.

As used herein, the term "immune checkpoint protein" has its general meaning in the art and refers to a molecule that is expressed by T cells in that either turn up a signal (stimulatory checkpoint molecules) or turn down a signal (inhibitory checkpoint molecules).

Examples of stimulatory checkpoint include CD27 CD28 CD40, CD122, CD137, OX40, GITR, and ICOS. Examples of inhibitory checkpoint molecules include A2AR, B7-H3, B7-H4, BTLA, CTLA-4, CD277, IDO, KIR, PD-1, PD-L1, LAG-3, TIM-3 and VISTA.

According to the invention, the MIS inhibitors and the classical treatment can be used as a combined treatment.

As used herein, the terms "combined treatment", "combined therapy" or "therapy combination" refer to a treatment that uses more than one medication. The combined therapy may be dual therapy or bi-therapy. The medications used in the combined treatment according to the invention are administered to the subject simultaneously, separately or sequentially.

As used herein, the term "administration simultaneously" refers to administration of 2 active ingredients by the same route and at the same time or at substantially the same time. The term "administration separately" refers to an administration of 2 active ingredients at the same time or at substantially the same time by different routes. The term "administration sequentially" refers to an administration of 2 active ingredients at different times, the administration route being identical or different.

Pharmaceutical Composition

The anti-MIS antibody of the invention may be used or prepared in a pharmaceutical composition.

In one embodiment, the invention relates to a pharmaceutical composition comprising the anti-MIS antibody of the invention and a pharmaceutical acceptable carrier for use in the treatment of MIS or MISRII positive cancer.

In some embodiment, the MIS or MISRII positive cancer is selected in the group consisting of gynecological cancer, lung cancer and colorectal cancer.

Typically, the inhibitor of the invention may be combined with pharmaceutically acceptable excipients, and optionally sustained-release matrices, such as biodegradable polymers, to form therapeutic compositions.

As used herein, the term "Pharmaceutically" or "pharmaceutically acceptable" refer to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type.

In the pharmaceutical compositions of the present invention for oral, sublingual, subcutaneous, intramuscular, intravenous, transdermal, local or rectal administration, the active principle, alone or in combination with another active principle, can be administered in a unit administration form, as a mixture with conventional pharmaceutical supports, to animals and human beings. Suitable unit administration forms comprise oral-route forms such as tablets, gel capsules, powders, granules and oral suspensions or solutions, sublingual and buccal administration forms, aerosols, implants, subcutaneous, transdermal, topical, intraperitoneal, intramuscular, intravenous, subdermal, transdermal, intrathecal and intranasal administration forms and rectal administration forms.

Preferably, the pharmaceutical compositions contain vehicles which are pharmaceutically acceptable for a formulation capable of being injected. These may be in particular isotonic, sterile, saline solutions (monosodium or disodium phosphate, sodium, potassium, calcium or magnesium chloride and the like or mixtures of such salts), or dry, especially freeze-dried compositions which upon addition, depending on the case, of sterilized water or physiological saline, permit the constitution of injectable solutions.

The pharmaceutical forms suitable for injectable use include sterile aqueous solutions or dispersions; formulations including sesame oil, peanut oil or aqueous propylene glycol; and sterile powders for the extemporaneous preparation of sterile injectable solutions or dispersions. In all cases, the form must be sterile and must be fluid to the extent that easy syringability exists. It must be stable under the conditions of manufacture and storage and must be preserved against the contaminating action of microorganisms, such as bacteria and fungi.

Solutions comprising inhibitors of the invention as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms.

The inhibitor of the invention can be formulated into a composition in a neutral or salt form. Pharmaceutically acceptable salts include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

The carrier can also be a solvent or dispersion medium containing, for example, water, ethanol, polyol (for example, glycerol, propylene glycol, and liquid polyethylene glycol, and the like), suitable mixtures thereof, and vegetables oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminium monostearate and gelatin.

Sterile injectable solutions are prepared by incorporating the active compounds in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

Upon formulation, solutions will be administered in a manner compatible with the dosage formulation and in such amount as is therapeutically effective. The formulations are easily administered in a variety of dosage forms, such as the type of injectable solutions described above, but drug release capsules and the like can also be employed.

For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous and intraperitoneal administration. In this connection, sterile aqueous media which can be employed will be known to those of skill in the art in light of the present disclosure. Some variation in dosage will necessarily occur depending on the condition of the subject being treated. The person responsible for administration will, in any event, determine the appropriate dose for the individual subject.

In addition to the MIS inhibitors of the invention formulated for parenteral administration, such as intravenous or intramuscular injection, other pharmaceutically acceptable forms include, e.g. tablets or other solids for oral administration; liposomal formulations; time release capsules; and any other form currently used.

Pharmaceutical compositions of the invention may include any further active agent which is used in the treatment of cancer, wherein the cancer is selected from the group consisting of gynecological cancer, lung cancer or colorectal cancer.

In one embodiment, said additional active agents may be contained in the same composition or administrated separately.

In another embodiment, the pharmaceutical composition of the invention relates to combined preparation for simultaneous, separate or sequential use in the treatment of MIS or MISRII positive cancer.

In some embodiment, the MIS or MISRII positive cancer is selected from the group consisting of gynecological cancer, lung cancer or colorectal cancer.

The invention also provides kits comprising the anti-MIS antibody of the invention. Kits containing the anti-MIS antibody of the invention find use in therapeutic methods.

The invention will be further illustrated by the following figures and examples. However, these examples and figures should not be interpreted in any way as limiting the scope of the present invention.

FIGURES

FIG. 1: Graphical abstract of the paradoxical effect of müllerian inhibiting substance (MIS) in ovarian carcinomas and of the proposed therapeutic strategy of MIS inhibition.

FIG. 2: Recombinant MIS (LRMIS) induces MIS signaling in COV434-MISRII and SKOV3-MISRII cells. A. Incubation with 1.6 to 25 nM LRMIS for 6 hours promotes apoptosis (caspase 3/7 activity). B. Clonogenic survival was quantified after culture in the presence of 1.6 to 2.5 nM LRMIS for 11 days by direct clone counting (COV434-MISRII cells) or by estimating the number of clones by OD at 595 nm after cell lysis (SKOV3-MISRII cells).

Figure 3:
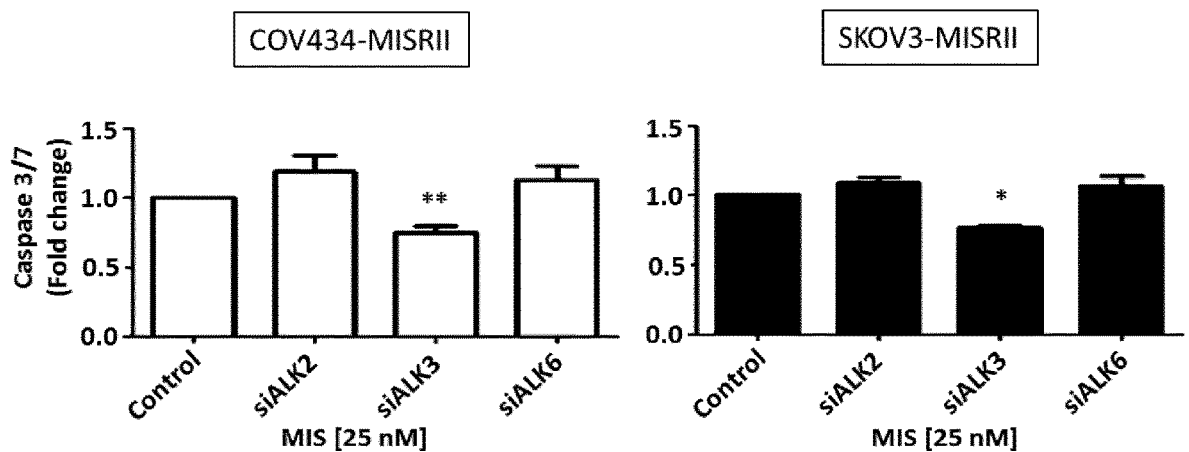

FIG. 3: Involvement of ALK2, ALK3 and ALK6 in MIS effect in COV434-MISRII and SKOV3-MISRII cells. Apoptis initiation (caspase 3/7 activity) was analyzed after incubation of siALK2, siALK3 or siALK6 transfected COV434-MISRII or SKOV3-MISRII cells with 25 nM MIS for 6 hours (started 48 hours after siRNA transfection).

Figure 4:
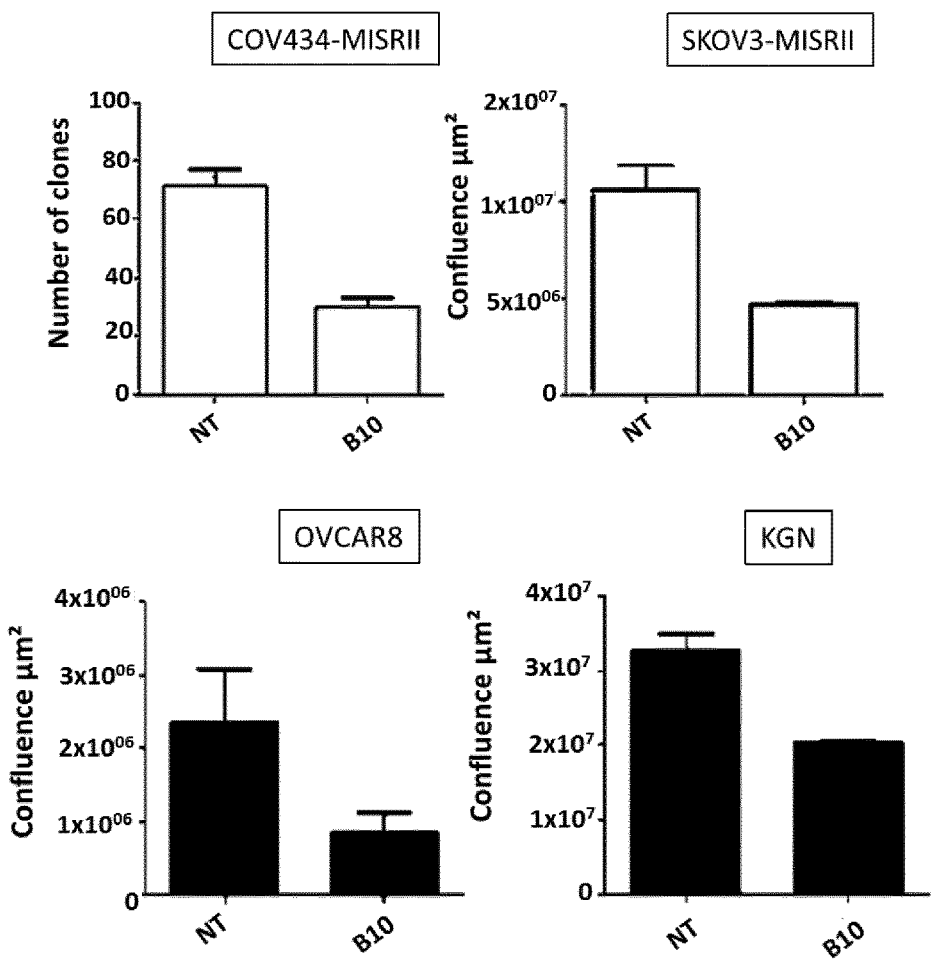

FIG. 4: The anti-MIS antibody B10 induces growth inhibition in COV434-MISRII, SKOV3-MISRII, OVCAR8 and KGN cells. Clonogenic survival in COV434-MISRII cells (direct clone counting) and in SKOV3-MISRII, OVCAR8 and KGN cells (measurement of cell confluence using the Celigo Imaging System) after incubation or not with 333 nM B10 for 11 days.

FIG. 5: The anti-MIS antibody B10 induces growth inhibition in tumor cells from ovarian carcinoma ascites samples. A. Cell growth inhibition (cell confluence measured with the Celigo Imaging System) after incubation or not (NT) with 330 nM B10 for 48 hours. B. Apoptosis induction (caspase 3/7 activity) after incubation or not with increasing concentrations of B10.

FIG. 6: The anti-AMH antibody B10 reduces COV434-MISRII tumor growth in vivo. Nude mice bearing COV434-MISRII cell tumors were treated with B10 (anti-AMH antibody), 12G4 (anti-AMHRII antibody) (10 mg/kg/injection for both), or vehicle (NaCl; control) twice a week for 4 weeks. A. Tumor growth curves (mean+95% confidence intervals), and B. Kaplan-Meier survival curves (percentage of mice with a tumor volume lower than 1,500 mm$^3$ as a function of time after graft).

EXAMPLE

Material & Methods
Cell Lines

The human COV434 (sex cord-stromal tumor) (Chan-Penebre et al., 2017; Zhang et al., 2000) and KGN (granulosa cell tumor) (Nishi et al., 2001) cell lines were kind gifts from Dr. PI Schrier (Department of Clinical Oncology, Leiden University Medical Center, Nederland) and Dr T Yanase (Kyushu University, Fukuoka, Japan), respectively. The human epithelial ovarian cancer cell lines SKOV3 and NIH-OVCAR8 were from ATCC (ATCC® HTB-77) and from the Division of Cancer Treatment and Diagnosis, NCI, Frederick, MD, USA, respectively. Cells were grown in DMEM F12 medium without red phenol containing 10% heat-inactivated fetal bovine serum (FBS). COV434-MISRII and SKOV3-MISRII cells were supplemented with 0.33 mg/ml geneticin (InvivoGen, ant-gn-1). Cells were grown at 37° C. in a humidified atmosphere with 5% CO2, and medium was replaced twice per week. Cells were harvested with 0.5 mg/ml trypsin/0.2 mg/ml EDTA. All culture media and supplements were purchased from Life Technologies. Inc. (Gibco BRL). The HEK293K cells, used for antibody production by the GenAc platform at IRCM, were grown in DMEM F12 with phenol red containing 10% heat-inactivated FBS.

The COV434-MISRII and SKOV3-MISRII cell lines were generated by transfection of the cDNA encoding full-length human MISRII (Kersual et al., 2014). The cDNA coding for full-length human MISRII in the pCMV6 plasmid was a generous gift by J Teixeira (Pediatric Surgical Research Laboratories, Massachusetts General Hospital, Harvard Medical School). MISRII cDNA was first subcloned in the pcDNA3.1.myc-His vector (Invitrogen) using the EcoRI and XhoI restriction sites (enzymes from New England BioLabs), and then, using the EcoRI and SalI sites, in the pIRES1-EGFP vector, a kind gift from F Poulat (IGH-UPR1142 CNRS). Twenty-four hours before transfection, COV434 cells were seeded in 10 cm cell culture dishes at 80% of confluence. The MISRII construct was transfected using the Fugene transfection kit according to the manufacturer's protocol. After 48 h, transfection medium was replaced with fresh medium containing 0.5 mg/ml geneticin and was then changed twice/week for two weeks. Then, cells were harvested and sorted using a FACSAria cytometer (Becton Dickinson) in 96-well plates. For each cell line, a clone that strongly expressed MISRII was selected and designed as COV434-MISRII and SKOV3-MISRII.

Primary Tumor Cells from Patients' Ascites

Ascites samples from two patients with ovarian cancer were obtained from the "Institut Cancer Montpellier, ICM" according to the French laws and after their informed consent. These two patients were selected because they never received any chemotherapy and were waiting for surgical intervention at the ICM—Val d'Aurelle Hospital. Freshly obtained ascites were aliquoted in 50 ml conical centrifuge tubes and spun at 1300 rpm for 5 min. Cell pellets were re-suspended in ammonium-chloride-potassium buffer (ACK lysis buffer: NH4Cl 150 nM; KHCO3 10 nM; Na2EDTA 0.1 nM) to lyse red blood cells (RBC) on ice for 5 min. The process was repeated until RBC lysis was complete. Then, cell pellets were plated on 150 mm cell culture dishes with 20 ml DMEM F12-Glutamax (Gibco) and 10% FBS. The same day, 100,000 cells were harvested to assess MISRII expression by FACS. Cells were then plated in DMEM F12/10% FBS for 30 minutes to rapidly eliminate adherent fibroblasts (0 Donnell et al., 2014). Non-adherent cells were transferred in new dishes with DMEM F12/10% FBS. Low-passage cells were used for experiments or frozen in liquid nitrogen.

Müllerian Inhibiting Substance (MIS) Production and Assay

The active recombinant MIS (LRMIS), described in the work by D Pépin et al. (Pepin et al., 2013, 2015) was used in our study. It contains (i) the 24AA leader sequence of albumin instead of the MIS leader sequence to increase production and secretion, and (ii) the RARR/S furin/kex2 consensus site instead of the native MIS RAQR/S sequence at position 423-428 to improve cleavage. MIS dosages were performed using the Elecsys® AMH (Anti-Mullerian Hormone) assay from Roche. All experiments involving LRMIS were performed in culture medium containing 1% FBS because bovine MIS can signal through human MISRII (Cate et al., 1986). In these experimental conditions, endogenous MIS concentration ranged from 5 to 10 pM in fresh medium to about 10 to 15 pM after 5 days of cell culture. To determine endogenous MIS concentration in cell culture supernatants, one million cells were plated in 100 mm cell culture dishes in 10 ml DMEM F12/1% FBS. Every 24 h, 300 µl of medium was removed for MIS dosage.

siRNA Transfections and Assays siRNAs sequences were designed with the Rosetta algorithm and are backed by Sigma-Aldrich predesigned siRNA guarantee. We used a pool of three siRNAs for each ALK receptor and for MIS. Cells were plated in 24-well plates up to 60-80% confluence. Transfection was performed in medium with 1% FBS using Lipofectamine RNAiMax Transfection Reagent diluted in Opti-MEM Medium according to the provider (Thermofisher cat #13778-150). siRNAs were diluted to 300 ng/ml (siRNAs against ALK2, ALK3, and ALK6) and to 1 µg/ml (siRNAs against MIS) in Opti-MEM, and the siRNA-Lipofectamine (1:1) mixture was added to the cells for 6 h. Cells were washed and cultured in DMEM F12/1% FBS. Experiments with siRNA-transfected cells were performed at 24 h (COV434-MISRII cells) and 48 h (SKOV3-MISRII cells) after transfection.

Anti MIS B10 Antibody Development and Production

Three anti-MIS human scFv antibodies were selected by phage display from the human scFv phage display library Husc I (Philibert et al., 2007; Robin and Martineau, 2012) after sequential panning using the Ala453-Arg560 MIS cTER domain (R&D). Antibodies were first expressed in the murine Ig2Ga format. The MAb B10 was selected for further experiments because it displayed the best binding to full-length MIS (Pépin et al., 2013), as determined by ELISA.

The MAb B10 antibody was produced in HEK293T cells (ATCC CRL1573). HEK293T cells were grown in 150 mm2 dishes up to 70% confluence. A 1:1 mixture of 30 µg of plasmid encoding B10 and 240 µg of the transfection agent polyethylenimine PEI (Polyscience) was kept at room temperature for 10 minutes, and then added to the cells for 6 hours. Then, the transfection medium was replaced by DMEM without FBS. Five days later, supernatant was collected and diluted (1:1) with 40 mM sodium phosphate buffer, pH 8, filtered through a 0.22 µm filter and purified on a 1 ml protein A column for 24 hours. Antibodies were eluted at acidic pH (glycine pH 3), and immediately stabilized with Tris buffer, pH 9. Centricons filters with a cut-off of 50 kDa were used to concentrate the antibody in PBS. Two hundreds ml of cell culture provided about 1 mg of purified antibody.

Western Blot Analysis

Cells were washed with PBS and scrapped immediately in RIPA lysis buffer (Santa Cruz) that included 200 mM PMSF solution, 100 mM sodium orthovanadate solution, and protease inhibitor cocktail. The protein concentration was determined using the BCA assay protein quantitation kit (Interchim). Cell extracts were heated at 95° C. for 5 min, separated (50 µg proteins/well) on 10% SDS-PAGE in reducing conditions (5% 2β-mercaptoethanol), and transferred to PVDF membranes (Biorad). Membranes were saturated in Tris-buffered saline, containing 0.1% Tween 20 and 5% non-fat dry milk, and probed with the relevant primary antibodies at RT for 1 h. After washing, peroxidase-conjugated IgG secondary antibodies were added (1/10,000) at RT for 1 h. After washing, antibody-antigen interactions were detected using a chemiluminescent substrate (Merck). To verify equal loading, immunoblots were also probed with an anti-GAPDH monoclonal antibody (Cell Signaling).

MIS Pathway Analysis

Cells were cultured in DMEM F12/1% FBS medium overnight, and then incubated with LRMIS (0-25 nM) at 37° C. for 6 hours. Western blotting was performed using anti-phosphorylated SMAD 1/5, anti-phosphorylated AKT, anti-cleaved caspase 3, anti-cleaved PARP, and anti-GAPDH primary antibodies (1:1.000; Cell Signaling), anti-ALK2, and anti-ALK3 antibodies (1 µg/ml; R&D system) at 4° C. overnight, followed by anti-rabbit and anti-goat IgG HRP secondary antibodies (1:10.000; Sigma) at room temperature for 1 hour.

Clonogenic Survival

Cells were plated in 24-well plates (50 cells/well) in DMEM F12/1% FBS medium overnight. LRMIS (0-25 nM) or the anti-MIS Mab B10 (333 nM) were then added for 11 days of culture. For COV434-MISRII cells, which grow as clearly individualized clones, colonies were fixed with a methanol/acetic acid solution (3:1) at 4° C. for 20 min, stained with 10% Giemsa, and counted. For SKOV3-MIS-RII, OVCAR8, KGN cells and cells from patient's ascites, the number of clones was estimated from the confluence area, determined using the Celigo Imaging System after cell staining with Hoechst 33342 trihydrochloride (Invitrogen H1399, 0.25 µg/ml for 15 min).

Apoptosis Assays

Apoptosis initiation was measured using the Caspase-Glos-3/7 assay (Promega). Cells were plated on white 96-well plates and incubated with LRMIS (0-25 nM) for 6 hours. Upon addition of the proluminescent caspase-3/7 DEVD-aminoluciferin substrate, caspase-3/7 generated free aminoluciferin that, consumed by luciferase, produced a luminescent signal proportional to the caspase-3/7 activity. The luminescent signal was quantified 30 min after substrate addition with a PHERASTAR microplate reader.

For a more complete analysis of apoptosis, the Annexin V-FITC Apoptosis Detection Kit (Beckman Coulter IM3614) was used. Approximately 100,000 cells per well were seeded in 24-well plates and incubated or not with 50 µg/ml Mab B10, 25 nM LRMIS, or 150 nM staurosporin (positive control) for 24 h. Adherent and detached cells were collected and centrifuged at 900 rpm for 5 min. After washes with PBS, cells were stained with 130 µl of a mixture containing 10 µl FITC-labeled annexin V and 20 µl 7AAD in 100 µl annexin buffer on ice in the dark for 15 min. After addition of 400 µl annexin buffer, fluorescence signal data were acquired by flow cytometry within 30 min, and data were analyzed with the Kaluza Flow Analysis software (Beckman Coulter).

Immunofluorescence

For each assay, 30 000 cells were grown on 22-mm square glass coverslips in 35-mm culture dishes in DMEM F12/ 10% FBS overnight. Cells were then starved with 1% FBS medium for 24 h before incubation with 25 nM LRMIS for 1 h 30. Cells were then fixed in 3.7% paraformaldehyde/PBS for 20 min and permeabilized in acetone at −20° C. for 30 s. Cells were washed twice with PBS/0.1% BSA and incubated with P3X63 (irrelevant antibody) (Köhler et al., 1976), the anti-MISRII 12G4 and anti-ALK2, anti-ALK3, anti-ALK6 (R&D) primary antibodies in the dark for 1 h. After another wash, cells were incubated with goat-FITC-labeled secondary antibodies in PBS/0.1% BSA for 1 h. Then, they were washed three times with PBS/0.1% BSA and once with PBS. Coverslips were mounted with EverBrite™ Hardest Mounting with DAPI (Biotium, Inc., Fremont, CA) and analyzed the day after with a Zeiss Axioplan 2 Imaging microscope.

Cell Viability Assay

For cell viability/proliferation testing, the CellTiter 96 AQueous One Solution Cell Proliferation Assay system (Promega) was used according to the manufacturer's instructions. Five thousand cells were plated in each well of a 96-well plate and cultured in 50 µl DMEM F12/1% FBS medium overnight. Cells were then incubated with LRMIS (0-25 nM) or the anti-MIS B10 antibody (0-333 nM) for 3 days. Then, 10 µl of CellTiter 96 AQueous One Solution reagent was added per well, and plates were incubated in humidified 5% CO2 atmosphere until the positive control wells became brown (from 1 to 2 h, depending on the cell line). Then, absorbance was measured at 490 nm using a PHERASTAR microplate reader. Three replicate wells were used for each condition.

Elisa Assay

ELISA was used to determine the EC50 of B10 antibody. Polyclonal anti-AMH antibodies (Abcam ab 84952) were coated on a 96 wells high protein-binding capacity plate (Nunc MaxiSorp) overnight. Then, the plate was washed 3 times and saturated with a PBS-Tween 0.01%-BSA 2% solution during 2 hours. After each step, the plate was washed 3 times with PBS-Tween 0.01%. The recombinant AMH (25 nM) was added and incubated for 2 hours at 37° C. Then, antibody B10 (666-0 nM) was added and incubated for 1 h30 at 37° C. The secondary anti-Fc mouse peroxidase (HRP) antibody was incubated for 30 min and the substrate enzyme (Thermofisher, TMB) was added. Absorbance was read at 450 nm after stopping the enzymatic reaction by the addition of sulfuric acid.

In Vivo Studies Using Ovarian Cancer Cell Xenografts

All animal experiments were performed in compliance with the guidelines of the French government and Inserm regulations for experimental animal studies (agreement D34-172-27). For all the in vivo experiments, $7 \cdot 10^6$ human COV434-MISRII cells 39 in BD Matrigel (ratio 1:1) in a volume of 150p1 were subcutaneously (sc) grafted on the right flank of female athymic nude Hsd mice (6-8 week-old) (ENVIGO, France), at day 0 (D0). Mice were randomized when tumor volume reached 60-150 mm³, at D12-D13 (n=5-7 mice/group). Treatments were all administered by intraperitoneal (ip) injection twice a week for 4 weeks. The anti-AMH MAb B10 (IgG2a format, produced in HEK296T cells) and the anti-AMHRII MAb 12G4 (chimeric IgG1 format, produced in CHO cells) were injected at 10 mg/kg. The untreated group received saline solution (vehicle). Tumor dimensions were measured with a caliper once per week, and tumor volumes were calculated using the formula: $D_1 \times D_2 \times D_3/2$. Results were also expressed with an adapted Kaplan-Meier survival curve, using the time needed for a tumor to reach the volume of 1,500 mm³. The median survival was defined as the time when 50% of mice had a tumor of 1,500 mm³.

Statistical Analysis

Statistical analyses concerning differences in caspase-3/7 activity and cell viability/proliferation were performed with the Prism software and ANOVA (Tukey's Multiple Comparison Test).

A linear mixed regression model was used to determine the relationship between tumor growth and the number of days post-graft. The fixed part of the model included variables corresponding to the number of days post-graft and the different groups. Interaction terms were built into the model. Random intercept and random slope were included to take into account the time effect. The coefficients of the model were estimated by maximum likelihood and considered significant at the 0.05 level. Survival rates were estimated from the xenograft date until the date when the tumor reached the volume of 1500 mm³ using the Kaplan-Meier method. Median survival was presented with 95% confidence intervals. Survival curves were compared using the log-rank test. Statistical analyses were carried out using the STATA 16.0 software (StataCorp, College Station, TX).

Results

Recombinant MIS Induces MIS Signaling in COV434-MISRII and SKOV3-MISRII Cells

Before evaluating the involvement of the different MIS-RIs, we analyzed MIS/MISRII signaling in two MISRII-positive ovarian cancer cell lines: COV434-MISRII (Kersual et al., 2014) and SKOV3-MISRII cells. Indeed, we and other authors found that MISRII expression in cell lines derived from ovarian carcinomas and ovarian carcinoma ascites rapidly and progressively decreases after long-term culture (Estupina et al., 2017; Pépin et al., 2015), thus limiting experiment reproducibility. For all the experiments described in this study, we used human recombinant AMH (LR-AMH; [10]) produced in CHO cells (Evitria AG, Zurich, Switzerland) according to the WO2014/164891 patent (data no shown). LR-AMH has the advantage of being completely cleaved while being the full-length hormone, thus combining efficiency and stability (Pepin et al., 2013; Wilson et al., 1993). We performed all experiments with LR-AMH in culture medium containing 1% FBS because it was reported that bovine AMH can signal through human AMHRII (Cate et al., 1986). In these experimental conditions, AMH concentration in the medium ranged from 5 to 10 pM in fresh medium to about 10 to 15 pM after 5 days of culture.

In both cell lines, SMAD1/5 phosphorylation was induced at all tested LRMIS concentrations (from 1.6 to 25 nM). Apoptosis, evaluated by measuring caspase-3/7 activity, was significantly induced starting at 12.5 nM LRMIS in COV434-MISRII cells and at 6.3 nM LRMIS in SKOV3-MISRII cells (FIG. 2A). We confirmed apoptosis induction by western blot analysis of cleaved caspase-3/7 and cleaved PARP (data not shown). Moreover, flow cytometry analysis showed that incubation with 25 nM LRMIS for 24 hours strongly induced apoptosis in COV434-MISRII cells compared with untreated cells (12.5% versus 3.6% of Annexin V-positive cells, and 16.3% versus 5.3% of AnnexinV/7AAD-positive cells), and to a lower extent also in SKOV3-MISRII cells (4.5% versus 5.4% of Annexin V-positive cells, and 11.3% versus 1.7% of AnnexinV/7AAD-positive cells) (data not shown). Finally, at all tested LRMIS concentrations, clonogenic survival was reduced in both cell lines (FIG. 2B). These results confirmed that the COV434-MISRII and SKOV3-MISRII cells are relevant models to study MIS signaling.

In Ovarian Cancer Cells, ALK3 is the Main MISRI Involved in MIS Signaling

To analyze MISRI involvement in MIS signaling in ovarian cancer cells, we transfected COV434-MISRII and SKOV3-MISRII cells with siRNAs targeting ALK2, ALK3 and ALK6. Due to the role of these receptors in different signaling pathways, their shRNA-mediated silencing was lethal in these cells. PCR and western blot analyses showed that a mixture of three siRNAs against ALK2 (siAlk2) and a mixture of three siRNAs against ALK6 (siAlk6) efficiently inhibited their expression (data not shown). Conversely, ALK3 silencing (siAlk3) was less efficient, particularly in COV434-MISRII cells. Incubation with LRMIS (25 nM, 6 hours) induced SMAD1/5 phosphorylation in siAlk2 and siAlk6, but not in siAlk3 COV434-MISRII and SKOV3-MISRII cells (data not shown). Caspase-3/7 activity and cleavage were not significantly different in siAlk2 and siAlk6 COV434-MISRII and SKOV3-MISRII cells and in COV434-MISRII and SKOV3-MISRII cells transfected with a control siRNA (FIG. 3). Conversely, apoptosis was reduced by about 25% in siAlk3 COV434-MISRII and SKOV3-MISRII cells compared with control. These results were confirmed by western blot analysis of PARP and caspase-3/7 cleavage (data not shown). These findings indicate that, despite incomplete silencing, MIS signaling is reduced mainly in siAlk3 COV434-MISRII and SKOV3-MISRII cells, demonstrating that ALK3 is the favorite MISRI receptor for MIS signaling in ovarian cancer cells.

In Ovarian Cancer Cells, MIS Modulates ALK2 and ALK3 Expression

We then investigated MIS effect on MISRII, ALK2, ALK3 and ALK6 expression in four MISRII-positive ovarian cancer cell lines: COV434-MISRII (sex cord stromal tumor), SKOV3-MISRII (epithelial cancer), OVCAR8 (epithelial cancer), and KGN (granulosa cell tumor). Immunofluorescence (IF) analysis showed that MISRII and ALK2 were clearly expressed in all four cell lines in basal condition (1% FBS corresponding to 10 pM MIS), and their expression was not modulated by incubation with 25 nM LRMIS for 90 min (data not shown). ALK3 expression was not detectable by IF in basal condition, but was induced by MIS addition (data not shown) in all four cell lines. ALK6 was not detectable in both experimental conditions.

Then, to determine the role of ALK2 and ALK3, we assessed their expression and that of MIS signaling proteins by western blotting in basal conditions and after incubation with LRMIS (1.6 to 25 nM) for 6 hours. In all four cell lines (data not shown), ALK2 basal expression decreased upon incubation with LRMIS and was almost undetectable in the presence of 6.25 or 12.5 nM LRMIS. Conversely, ALK3 expression increased upon LRMIS exposure. Moreover, SMAD1/5 phosphorylation caspase-3/7 activity, and caspase 3 and PARP cleavage increased in parallel with ALK3 expression (data not shown).

To analyze the involvement of non-SMAD pathways in MIS signaling (Beck et al., 2016; Zhang, 2017), we monitored AKT phosphorylation and found that it decreased upon incubation with LRMIS, as observed for ALK2 expression (data not shown).

These results confirmed that in ovarian carcinoma cells, ALK3 is the major MISRI in MIS signaling through the SMAD pathway for inducing apoptosis (starting around 6 nM of LRMIS). ALK2 is expressed in basal conditions (around 10 pM MIS) and then its expression is reduced upon incubation with LRMIS.

The Anti-MIS Antibody B10 Reduces Cell Proliferation and Induces Growth Inhibition in Ovarian Cancer Cells To test whether the proliferative effect of MIS at low concentration could be blocked by an antibody as a potential therapeutic strategy, we produced a new MAb against MIS. The B10 antibody was isolated from the human scFv phage display library Husc I (Philibert et al., 2007; Robin and Martineau, 2012) after panning using the Ala453-Arg560 MIS cTER domain that is bioactive despite a lower activity than cleaved MIS (Nachtigal and Ingraham, 1996; Wilson et al., 1993). First, we characterized B10 affinity for MIS by ELISA (EC50=50.4±1.2 nM) and its capacity to inhibit the apoptotic effect of 25 nM LRMIS in COV434-MISRII and SKOV3-MISRII cells (data not shown). Caspase-3/7 activity induced by 25 nM MIS (fold change relative to untreated cells) was reduced by about 40% in the presence of about 66 nM B10.

We then assessed B10 effect on cell viability in the presence of low LRMIS concentrations (0.1 to 0.6 nM). Depending on the cell line, B10 induced a decrease of 25% (OVCAR8) to 50% (KGN) of cell viability at concentrations ranging between 3 and 333 nM (data not shown). Moreover, 333 nM B10 reduced clonogenic survival by 57.5%, 57.1%, 64.7% and 37.5% in COV434-MISRII, SKOV3-MISRII, OVCAR8 and KGN cells, respectively (FIG. 4). In the four cell lines, B10 reduced AKT phosphorylation, and increased PARP and caspase 3 cleavage (data not shown), a phenomenon initially observed only at high LRMIS concentrations (FIGS. 2A and B).

Finally, we assessed B10 effect in primary cancer cells isolated from ascites samples of two patients with ovarian cancer. These patients were awaiting surgical intervention and had never received chemotherapy. Like in the four cell lines, B10 reduced cell viability by 30% and 20% (patient 1 and 2, respectively) (data not shown) and inhibited cell growth (estimated by the confluence area) by 25% and 65% (patient 1 and 2, respectively) (FIG. 5A), while it increased caspase-3/7 activity up to 3 times (FIG. 5B). Despite the limited number of samples, these results highlight the potential translational perspective of blocking MIS proliferative effect with specific antibodies.

The Anti-AMH Antibody B10 Reduces COV434-MISRII Tumor Growth In Vivo

Figures 6A, 6B:
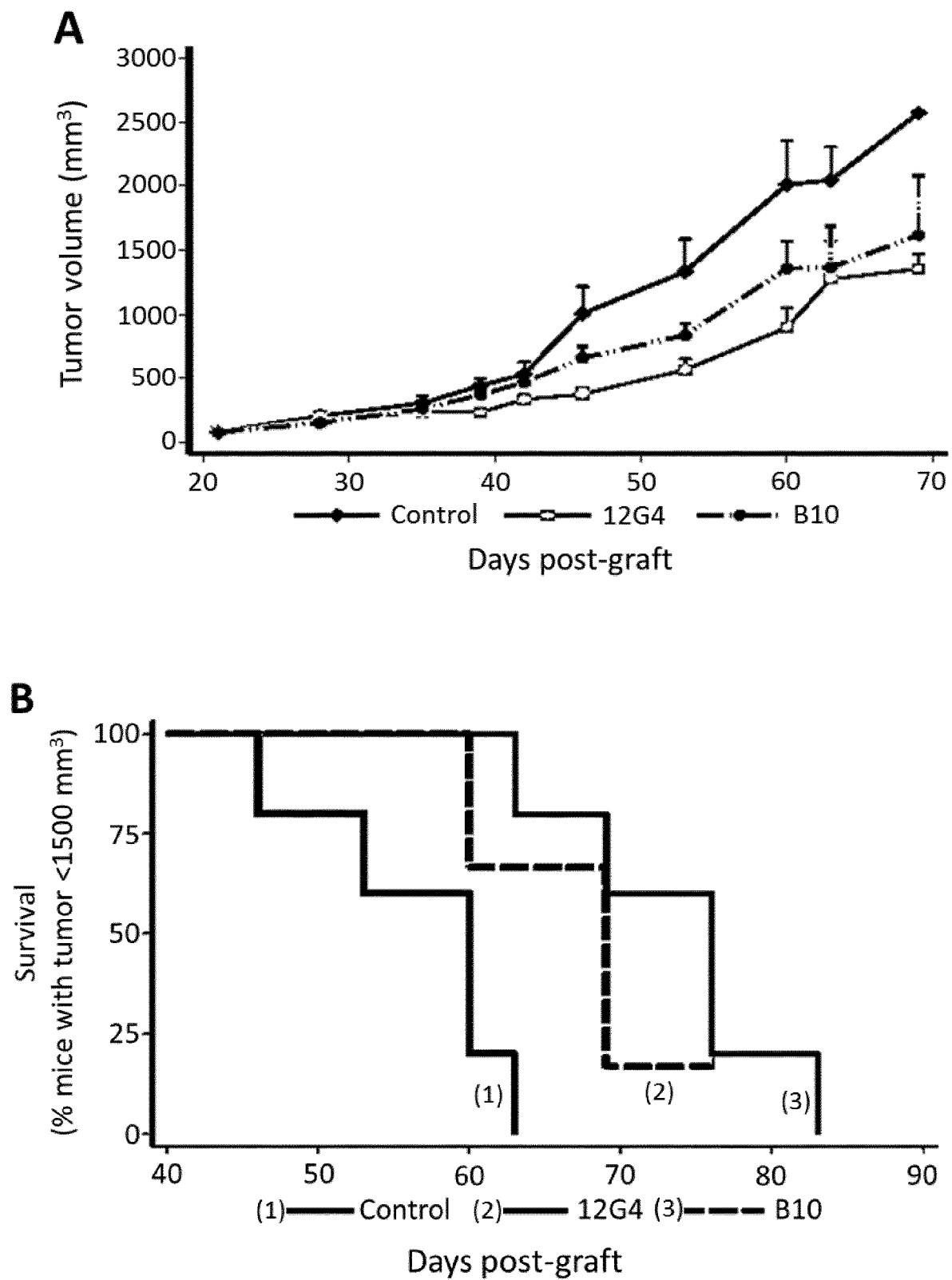

To evaluate whether B10 anti-proliferative effect in vitro could translate into an anti-tumor activity in vivo, we treated mice harboring established COV434-MISRII cell-derived tumors (5 to 7 mice/group) with B10 (anti-AMH antibody), 12G4 (anti-AMHRII antibody) (10 mg/kg/injection for both), or vehicle (NaCl) by ip injection twice per week for 4 weeks. Both B10 and 12G4 inhibited tumor growth compared with vehicle (p<0.001) (FIG. 6A). The median survival time, defined as the time when 50% of mice had a tumor of 1,500 mm$^3$, was 60, 69 and 76 days for mice treated with vehicle, B10 and 12G4, respectively (p=0.0050 and p=0.0173 for 12G4 and B10 vs control; p=0.4331 between 12G4 and B10) (FIG. 6B).

Discussion

Here, using two ovarian cancer cell lines (COV434-MISRII and SKOV3-MISRII), we found that ALK3 is the favorite MISRI for MIS signaling and apoptosis induction. In four ovarian cancer cell lines (COV434-MISRII, SKOV3-MISRII, OVCAR8 and KGN), we showed that ALK2 and ALK3 are modulated by incubation with LRMIS, and that ALK3 is preferentially expressed when high doses of LRMIS are used to induce apoptosis (FIGS. 2A and 2B). These results, confirmed in tumor cells isolated from ascites samples of two patients with ovarian carcinoma, are currently used to develop new therapeutic strategies.

MIS has been proposed as a potential treatment for gynecologic tumors since 1979 (Donahoe et al., 1979), based on the observation by RE Scully that epithelial ovarian carcinoma resembles histologically the tissues derived from Müllerian ducts (Scully, 1970). Many studies, reviewed by Kim J H et al., validated the potential application of MIS as a bio-drug for cancer therapy (Kim et al., 2014) in ovarian cancer (Anttonen et al., 2011; Fuller et al., 1982; Masiakos et al., 1999; Pieretti-Vanmarcke et al., 2006; Stephen et al., 2002), cervical and endometrial cancer (Barbie et al., 2003; Renaud et al., 2005) as well as in non-Müllerian tumors, such as breast (Gupta et al., 2005) and prostate cancer (Hoshiya et al., 2003). Specifically, these studies showed that high doses of MIS can inhibit cancer cell growth in vitro and in vivo, in cell lines and in patient samples. Interestingly, recent results suggested that MIS could be efficient also in chemotherapy-resistant cancer cells and cancer stem cells (Meirelles et al., 2012; Wei et al., 2010). The major issue for a clinical application of this strategy is the availability of high amount of clinical-grade MIS. To our knowledge, the most advanced strategy is the one developed by Pepin et al. (i.e., LRMIS with an albumin leader sequence and a cleavage site modification leading to high yield of bioactive MIS) (Pepin et al., 2013).

The common point of these studies is that they all used high doses of MIS to treat cancer cells, typically from 25 to 200 nM. This concentration has to be compared to the highest MIS serum concentration observed physiologically (boys from birth to puberty), which is lower than 1 nM (around 50 ng/ml). This is perfectly logical because this strategy is based on MIS induction of apoptosis during Müllerian duct regression. We obtained similar results in the present study, but we also focused on the observation that at low concentration (0.8 nM to 6.1 nM, depending on the cell line) MIS promoted cell survival/proliferation.

Moreover, Beck T N et al. showed that in lung cancer, MIS/MISRII signaling regulates epithelial-mesenchymal transition (EMT) and promotes cell survival/proliferation (Beck et al., 2016). They suggested that MIS/MISRII signaling role in EMT regulation was important for chemoresistance. In the present study we showed that the new anti-MIS MAb B10 can reduce cell viability, clonogenic survival, and ATK phosphorylation in all four ovarian cancer cell lines and tumor cells isolated from ovarian cancer ascites samples (FIG. 4). All these in vitro data indicate that inhibition of physiological concentrations of AMH can mimic the effect of supraphysiological concentrations of exogenous AMH. As the first step towards the in vivo proof of this concept, we showed that in mice, the B10 anti-AMH antibody reduced the growth of COV434-AM- HRII cell-derived tumors and significantly increased their median survival time compared with the control group (no treatment)(FIG. 6).

Based on these results, we propose that anti-MIS MAbs, such as B10, could represent an innovative therapeutic approach to suppress MIS proliferative effect rather than administer high MIS doses to induce apoptosis. This strategy could be first evaluated in gynecological tumors where the MIS/MISRII signaling pathway is well described, and then in colorectal cancers in which (i) the MIS gene is upregulated (Pellatt et al., 2018), and (ii) high MIS RNA expression is an unfavorable prognostic factor (n=597 patients with a follow-up of more than 12 years) (Uhlen et al., 2017).

REFERENCES

Throughout this application, various references describe the state of the art to which this invention pertains. The disclosures of these references are hereby incorporated by reference into the present disclosure.

Anttonen, M., Färkkilä, A., Tauriala, H., Kauppinen, M., Maclaughlin, D. T., Unkila-Kallio, L., Bützow, R., and Heikinheimo, M. (2011). Anti-Müllerian hormone inhibits growth of AMH type II receptor-positive human ovarian granulosa cell tumor cells by activating apoptosis. Lab. Investig. J. Tech. Methods Pathol. 91, 1605-1614.

Bakkum-Gamez, J. N., Aletti, G., Lewis, K. A., Keeney, G. L., Thomas, B. M., Navarro-Teulon, I., and Cliby, W. A. (2008). Müllerian inhibiting substance type II receptor (MISIIR): a novel, tissue-specific target expressed by gynecologic cancers. Gynecol. Oncol. 108, 141-148.

Barbie, T. U., Barbie, D. A., MacLaughlin, D. T., Maheswaran, S., and Donahoe, P. K. (2003). Mullerian Inhibiting Substance inhibits cervical cancer cell growth via a pathway involving p130 and p107. Proc. Natl. Acad. Sci. U.S.A 100, 15601-15606.

Basal, E., Ayeni, T., Zhang, Q., Langstraat, C., Donahoe, P. K., Pepin, D., Yin, X., Leof, E., and Cliby, W. (2016). Patterns of Müllerian Inhibiting Substance Type II and Candidate Type I Receptors in Epithelial Ovarian Cancer. Curr. Mol. Med. 16, 222-231.

Beck, T. N., Korobeynikov, V. A., Kudinov, A. E., Georgopoulos, R., Solanki, N. R., Andrews-Hoke, M., Kistner, T. M., Pepin, D., Donahoe, P. K., Nicolas, E., et al. (2016). Anti-Müllerian Hormone Signaling Regulates Epithelial Plasticity and Chemoresistance in Lung Cancer. Cell Rep. 16, 1-15.

Belville, C., Jamin, S. P., Picard, J.-Y., Josso, N., and di Clemente, N. (2005). Role of type I receptors for anti-Müllerian hormone in the SMAT-1 Sertoli cell line. Oncogene 24, 4984-4992.

Bougherara, H., Némati, F., Nicolas, A., Massonnet, G., Pugnière, M., NO, C., Le Frère-Belda, M.-A., Leary, A., Alexandre, J., Meseure, D., et al. (2017). The humanized anti-human AMHRII mAb 3C23K exerts an anti-tumor activity against human ovarian cancer through tumor-associated macrophages. Oncotarget 8, 99950-99965.

Cate, R. L., Mattaliano, R. J., Hession, C., Tizard, R., Farber, N. M., Cheung, A., Ninfa, E. G., Frey, A. Z., Gash, D. J., and Chow, E. P. (1986). Isolation of the bovine and human genes for Müllerian inhibiting substance and expression of the human gene in animal cells. Cell 45, 685-698.

Chan-Penebre, E., Armstrong, K., Drew, A., Grassian, A. R., Feldman, I., Knutson, S. K., Kuplast-Barr, K., Roche, M., Campbell, J., Ho, P., et al. (2017). Selective Killing of SMARCA2- and SMARCA4-deficient Small Cell Carcinoma of the Ovary, Hypercalcemic Type Cells by Inhibition of EZH2: In Vitro and In Vivo Preclinical Models. Mol. Cancer Ther. 16, 850-860.

Clarke, T. R., Hoshiya, Y., Yi, S. E., Liu, X., Lyons, K. M., and Donahoe, P. K. (2001). Müllerian inhibiting substance signaling uses a bone morphogenetic protein (BMP)-like pathway mediated by ALK2 and induces SMAD6 expression. Mol. Endocrinol. Baltim. Md. 15, 946-959.

di Clemente, N., Jamin, S. P., Lugovskoy, A., Carmillo, P., Ehrenfels, C., Picard, J.-Y., Whitty, A., Josso, N., Pepinsky, R. B., and Cate, R. L. (2010). Processing of anti-müllerian hormone regulates receptor activation by a mechanism distinct from TGF-beta. Mol. Endocrinol. Baltim. Md. 24, 2193-2206.

Donahoe, P. K., Swann, D. A., Hayashi, A., and Sullivan, M. D. (1979). Müllerian duct regression in the embryo correlated with cytotoxic activity against human ovarian cancer. Science 205, 913-915.

Donahoe, P. K., Clarke, T., Teixeira, J., Maheswaran, S., and MacLaughlin, D. T. (2003). Enhanced purification and production of Müllerian inhibiting substance for therapeutic applications. Mol. Cell. Endocrinol. 211, 37-42.

Estupina, P., Fontayne, A., Barret, J.-M., Kersual, N., Dubreuil, O., Le Blay, M., Pichard, A., Jarlier, M., Pugniere, M., Chauvin, M., et al. (2017). The anti-tumor efficacy of 3C23K, a glyco-engineered humanized anti-MISRII antibody, in an ovarian cancer model is mainly mediated by engagement of immune effector cells. Oncotarget 8, 37061-37079.

Fuller, A. F., Guy, S., Budzik, G. P., and Donahoe, P. K. (1982). Mullerian inhibiting substance inhibits colony growth of a human ovarian carcinoma cell line. J. Clin. Endocrinol. Metab. 54, 1051-1055.

Gill, S. E., Zhang, Q., Keeney, G. L., Cliby, W. A., and Weroha, S. J. (2017). Investigation of factors affecting the efficacy of 3C23K, a human monoclonal antibody targeting MISIIR. Oncotarget.

Gupta, V., Carey, J. L., Kawakubo, H., Muzikansky, A., Green, J. E., Donahoe, P. K., MacLaughlin, D. T., and Maheswaran, S. (2005). Mullerian inhibiting substance suppresses tumor growth in the C3(1)T antigen transgenic mouse mammary carcinoma model. Proc. Natl. Acad. Sci. U.S.A 102, 3219-3224.

Horbelt, D., Denkis, A., and Knaus, P. (2012). A portrait of Transforming Growth Factor β superfamily signalling: Background matters. Int. J. Biochem. Cell Biol. 44, 469-474.

Hoshiya, Y., Gupta, V., Segev, D. L., Hoshiya, M., Carey, J. L., Sasur, L. M., Tran, T. T., Ha, T. U., and Maheswaran, S. (2003). Mullerian Inhibiting Substance induces NFkB signaling in breast and prostate cancer cells. Mol. Cell. Endocrinol. 211, 43-49.

Josso, N., and Clemente, N. di (2003). Transduction pathway of anti-Müllerian hormone, a sex-specific member of the TGF-beta family. Trends Endocrinol. Metab. TEM 14, 91-97.

Josso, N., Racine, C., di Clemente, N., Rey, R., and Xavier, F. (1998). The role of anti-Müllerian hormone in gonadal development. Mol. Cell. Endocrinol. 145, 3-7.

Kersual, N., Garambois, V., Chardès, T., Pouget, J.-P., Salhi, I., Bascoul-Mollevi, C., Bibeau, F., Busson, M., Vié, H., Clémenceau, B., et al. (2014). The human Müllerian inhibiting substance type II receptor as immunotherapy target for ovarian cancer. Validation using the mAb 12G4. MAbs 6, 1314-1326.

Kim, J. H., MacLaughlin, D. T., and Donahoe, P. K. (2014). Müllerian inhibiting substance/anti-Müllerian hormone: A novel treatment for gynecologic tumors. Obstet. Gynecol. Sci. 57, 343-357.

Kittler, R., Surendranath, V., Heninger, A.-K., Slabicki, M., Theis, M., Putz, G., Franke, K., Caldarelli, A., Grabner, H., Kozak, K., et al. (2007). Genome-wide resources of endoribonuclease-prepared short interfering RNAs for specific loss-of-function studies. Nat. Methods 4, 337-344.

Köhler, G., Howe, S. C., and Milstein, C. (1976). Fusion between immunoglobulin-secreting and nonsecreting myeloma cell lines. Eur. J. Immunol. 6, 292-295.

Masiakos, P. T., MacLaughlin, D. T., Maheswaran, S., Teixeira, J., Fuller, A. F., Shah, P. C., Kehas, D. J., Kenneally, M. K., Dombkowski, D. M., Ha, T. U., et al. (1999). Human ovarian cancer, cell lines, and primary ascites cells express the human Mullerian inhibiting substance (MIS) type II receptor, bind, and are responsive to MIS. Clin. Cancer Res. Off. J. Am. Assoc. Cancer Res. 5, 3488-3499.

Mazumder, S., Johnson, J. M., Swank, V., Dvorina, N., Martelli, E., Ko, J., and Tuohy, V. K. (2017). Primary Immunoprevention of Epithelial Ovarian Carcinoma by Vaccination against the Extracellular Domain of Anti-Müllerian Hormone Receptor II. Cancer Prev. Res. Phila. Pa. 10, 612-624.

Meirelles, K., Benedict, L. A., Dombkowski, D., Pepin, D., Preffer, F. I., Teixeira, J., Tanwar, P. S., Young, R. H., MacLaughlin, D. T., Donahoe, P. K., et al. (2012). Human ovarian cancer stem/progenitor cells are stimulated by doxorubicin but inhibited by Mullerian inhibiting substance. Proc. Natl. Acad. Sci. U.S.A. 109, 2358-2363.

Nachtigal, M. W., and Ingraham, H. A. (1996). Bioactivation of Müllerian inhibiting substance during gonadal development by a kex2/subtilisin-like endoprotease. Proc. Natl. Acad. Sci. U.S.A 93, 7711-7716.

Nishi, Y., Yanase, T., Mu, Y., Oba, K., Ichino, I., Saito, M., Nomura, M., Mukasa, C., Okabe, T., Goto, K., et al. (2001). Establishment and characterization of a steroidogenic human granulosa-like tumor cell line, KGN, that expresses functional follicle-stimulating hormone receptor. Endocrinology 142, 437-445.

Donnell, R. L., McCormick, A., Mukhopadhyay, A., Woodhouse, L. C., Moat, M., Grundy, A., Dixon, M., Kaufman, A., Soohoo, S., Elattar, A., et al. (2014). The use of ovarian cancer cells from patients undergoing surgery to generate primary cultures capable of undergoing functional analysis. PloS One 9, e90604.

Orvis, G. D., Jamin, S. P., Kwan, K. M., Mishina, Y., Kaartinen, V. M., Huang, S., Roberts, A. B., Umans, L., Huylebroeck, D., Zwijsen, A., et al. (2008). Functional redundancy of TGF-beta family type I receptors and receptor-Smads in mediating anti-Mullerian hormone-induced Mullerian duct regression in the mouse. Biol. Reprod. 78, 994-1001.

Pellatt, A. J., Mullany, L. E., Herrick, J. S., Sakoda, L. C., Wolff, R. K., Samowitz, W. S., and Slattery, M. L. (2018). The TGFβ-signaling pathway and colorectal cancer: associations between dysregulated genes and miRNAs. J. Transl. Med. 16, 191.

Pépin, D. (2014). Modified mullerian inhibiting substance (mis) proteins and uses thereof for the treatment of diseases.

Pépin, D., Hoang, M., Nicolaou, F., Hendren, K., Benedict, L. A., Al-Moujahed, A., Sosulski, A., Marmalidou, A., Vavvas, D., and Donahoe, P. K. (2013). An albumin leader sequence coupled with a cleavage site modification enhances the yield of recombinant C-terminal Mullerian Inhibiting Substance. Technol. Elmsford N 1, 63-71.

Pépin, D., Sosulski, A., Zhang, L., Wang, D., Vathipadiekal, V., Hendren, K., Coletti, C. M., Yu, A., Castro, C. M., Birrer, M. J., et al. (2015). AAV9 delivering a modified human Mullerian inhibiting substance as a gene therapy in patient-derived xenografts of ovarian cancer. Proc. Natl. Acad. Sci. U.S.A 112, E4418-4427.

Philibert, P., Stoessel, A., Wang, W., Sibler, A.-P., Bec, N., Larroque, C., Saven, J. G., Courtête, J., Weiss, E., and Martineau, P. (2007). A focused antibody library for selecting scFvs expressed at high levels in the cytoplasm. BMC Biotechnol. 7, 81.

Pieretti-Vanmarcke, R., Donahoe, P. K., Szotek, P., Manganaro, T., Lorenzen, M. K., Lorenzen, J., Connolly, D. C., Halpern, E. F., and MacLaughlin, D. T. (2006). Recombinant human Mullerian inhibiting substance inhibits long-term growth of MIS type II receptor-directed transgenic mouse ovarian cancers in vivo. Clin. Cancer Res. Off. J. Am. Assoc. Cancer Res. 12, 1593-1598.

Rehman, Z. U., Worku, T., Davis, J. S., Talpur, H. S., Bhattarai, D., Kadariya, I., Hua, G., Cao, J., Dad, R., Farmanullah, null, et al. (2017). Role and mechanism of AMR in the regulation of Sertoli cells in mice. J. Steroid Biochem. Mol. Biol. 174, 133-140.

Renaud, E. J., MacLaughlin, D. T., Oliva, E., Rueda, B. R., and Donahoe, P. K. (2005). Endometrial cancer is a receptor-mediated target for Mullerian Inhibiting Substance. Proc. Natl. Acad. Sci. U.S.A 102, 111-116.

Robin, G., and Martineau, P. (2012). Synthetic customized scFv libraries. Methods Mol. Biol. Clifton NJ 907, 109-122.

Salhi, I., Cambon-Roques, S., Lamarre, I., Laune, D., Molina, F., Pugnière, M., Pourquier, D., Gutowski, M., Picard, J.-Y., Xavier, F., et al. (2004). The anti-Müllerian hormone type II receptor: insights into the binding domains recognized by a monoclonal antibody and the natural ligand. Biochem. J. 379, 785-793.

Scully, R. E. (1970). Recent progress in ovarian cancer. Hum. Pathol. 1, 73-98.

Sèdes, L., Leclerc, A., Moindjie, H., Cate, R. L., Picard, J.-Y., di Clemente, N., and Jamin, S. P. (2013). Anti-Müllerian hormone recruits BMPR-IA in immature granulosa cells. PloS One 8, e81551.

Song, J. Y., Chen, K. Y., Kim, S. Y., Kim, M. R., Ryu, K. S., Cha, J. H., Kang, C. S., MacLaughlin, D. T., and Kim, J. H. (2009). The expression of Müllerian inhibiting substance/anti-Müllerian hormone type II receptor protein and mRNA in benign, borderline and malignant ovarian neoplasia. Int. J. Oncol. 34, 1583-1591.

Stephen, A. E., Pearsall, L. A., Christian, B. P., Donahoe, P. K., Vacanti, J. P., and MacLaughlin, D. T. (2002). Highly purified müllerian inhibiting substance inhibits human ovarian cancer in vivo. Clin. Cancer Res. Off. J. Am. Assoc. Cancer Res. 8, 2640-2646.

Uhlen, M., Zhang, C., Lee, S., Sjöstedt, E., Fagerberg, L., Bidkhori, G., Benfeitas, R., Arif, M., Liu, Z., Edfors, F., et al. (2017). A pathology atlas of the human cancer transcriptome. Science 357.

Visser, J. A., Olaso, R., Verhoef-Post, M., Kramer, P., Themmen, A. P., and Ingraham, H. A. (2001). The serine/threonine transmembrane receptor ALK2 mediates Müllerian inhibiting substance signaling. Mol. Endocrinol. Baltim. Md. 15, 936-945.

Wei, X., Dombkowski, D., Meirelles, K., Pieretti-Vanmarcke, R., Szotek, P. P., Chang, H. L., Preffer, F. I., Mueller, P. R., Teixeira, J., MacLaughlin, D. T., et al. (2010). Mullerian inhibiting substance preferentially inhibits stem/progenitors in human ovarian cancer cell lines compared with chemotherapeutics. Proc. Natl. Acad. Sci. U.S.A 107, 18874-18879.

Wilson, C. A., di Clemente, N., Ehrenfels, C., Pepinsky, R. B., Josso, N., Vigier, B., and Cate, R. L. (1993). Mullerian inhibiting substance requires its N-terminal domain for maintenance of biological activity, a novel finding within the transforming growth factor-beta superfamily. Mol. Endocrinol. Baltim. Md. 7, 247-257.

Yuan, Q., Simmons, H. H., Robinson, M. K., Russeva, M., Marasco, W. A., and Adams, G. P. (2006). Development of engineered antibodies specific for the Müllerian inhibiting substance type II receptor: a promising candidate for targeted therapy of ovarian cancer. Mol. Cancer Ther. 5, 2096-2105.

Yuan, Q.-A., Robinson, M. K., Simmons, H. H., Russeva, M., and Adams, G. P. (2008). Isolation of anti-MISIIR scFv molecules from a phage display library by cell sorter biopanning. Cancer Immunol. Immunother. CII 57, 367-378.

Zhan, Y., Fujino, A., MacLaughlin, D. T., Manganaro, T. F., Szotek, P. P., Arango, N. A., Teixeira, J., and Donahoe, P. K. (2006). Müllerian inhibiting substance regulates its receptor/SMAD signaling and causes mesenchymal transition of the coelomic epithelial cells early in Müllerian duct regression. Dev. Camb. Engl. 133, 2359-2369.

Zhang, Y. E. (2017). Non-Smad Signaling Pathways of the TGF-β Family. Cold Spring Harb. Perspect. Biol. 9.

Zhang, H., Vollmer, M., De Geyter, M., Litzistorf, Y., Ladewig, A., Dürrenberger, M., Guggenheim, R., Miny, P., Holzgreve, W., and De Geyter, C. (2000). Characterization of an immortalized human granulosa cell line (COV434). Mol. Hum. Reprod. 6, 146-153.

The invention claimed is:

1. An isolated anti-müllerian inhibiting substance (MIS) antibody comprising: (a) a heavy chain wherein the variable domain comprises the H-CDR1 of SEQ ID NO: 1; the H-CDR2 of SEQ ID NO: 2 or SEQ ID NO: 3; the H-CDR3 of SEQ ID NO: 4; and (b) a light chain wherein the variable domain comprises the L-CDR1 of SEQ ID NO: 5; the L-CDR2 of SEQ ID NO: 6; the L-CDR3 of SEQ ID NO: 7.

2. The isolated anti-MIS antibody according to claim 1 comprising: (a) a variable heavy chain comprising at least 70% identity of SEQ ID NO: 8 wherein the variable domain comprises the H-CDR1 of SEQ ID NO: 1; the H-CDR2 of SEQ ID NO: 2; the H-CDR3 of SEQ ID NO: 4; and (b) a variable light chain comprising at least 70% identity of SEQ ID NO: 10 wherein the variable domain comprises the H-CDR1 of SEQ ID NO: 5; the H-CDR2 of SEQ ID NO: 6; the H-CDR3 of SEQ ID NO: 7.

3. The isolated anti-MIS antibody according to claim 1 comprising: (c) a variable heavy chain comprising at least 70% identity of SEQ ID NO:9 wherein the variable domain comprises the H-CDR1 of SEQ ID NO: 1; the H-CDR2 of SEQ ID NO: 3; the H-CDR3 of SEQ ID NO: 4; and (d) a variable light chain comprising at least 70% identity of SEQ ID NO: 10 wherein the variable domain comprises the H-CDR1 of SEQ ID NO: 5; the H-CDR2 of SEQ ID NO: 6; the H-CDR3 of SEQ ID NO: 7.

4. The isolated anti-MIS antibody according to claim 1 comprising the heavy chain of SEQ ID NO: 8 and the light chain of SEQ ID NO: 10.

5. The isolated anti-MIS antibody according to claim 1 comprising the heavy chain of SEQ ID NO: 9 and the light chain of SEQ ID NO: 10.

6. A nucleic acid molecule encoding the anti-MIS antibody of claim 1.

7. A vector that comprises the nucleic acid of claim 6.

8. A host cell which has been transfected, infected or transformed by the nucleic acid of claim 6 and/or a vector comprising the nucleic acid.

9. A pharmaceutical composition comprising the anti-MIS antibody of claim 1.

10. A method of treating an MIS or MISRII positive cancer in a subject in need thereof, comprising
   administering to the subject a therapeutically effective amount of the antibody of claim 1.

11. The method according to claim 10, wherein the antibody is administered in combination with a classical treatment of the MIS or MISRII positive cancer.

12. The method according to claim 10, wherein the MIS or MISRII positive cancer is selected from the group consisting of gynecological cancer, lung cancer and colorectal cancer.

\* \* \* \* \*

```
                          SEQUENCE LISTING

<160> NUMBER OF SEQ ID NOS: 10

<210> SEQ ID NO 1
<211> LENGTH: 8
<212> TYPE: PRT
<213> ORGANISM: Artificial Sequence
<220> FEATURE:
<223> OTHER INFORMATION: Synthetic B10 VH-CDR1

<400> SEQUENCE: 1

Gly Phe Thr Phe Ser Asn Tyr Asn
1               5

<210> SEQ ID NO 2
<211> LENGTH: 8
<212> TYPE: PRT
<213> ORGANISM: Artificial Sequence
<220> FEATURE:
<223> OTHER INFORMATION: Synthetic B10 native VH-CDR2

<400> SEQUENCE: 2

Ile Asn Gly Ser Ser Arg Ser Ile
1               5

<210> SEQ ID NO 3
<211> LENGTH: 8
<212> TYPE: PRT
<213> ORGANISM: Artificial Sequence
<220> FEATURE:
<223> OTHER INFORMATION: Synthetic B10 derivative VH-CDR2

<400> SEQUENCE: 3

Ile Asn Gly Ala Ser Arg Ser Ile
1               5

<210> SEQ ID NO 4
<211> LENGTH: 12
<212> TYPE: PRT
<213> ORGANISM: Artificial Sequence
<220> FEATURE:
<223> OTHER INFORMATION: Synthetic B10 VH-CDR3

<400> SEQUENCE: 4

Val Arg Ser Ser Tyr Tyr Gly Gly Gly Met Asp Val
1               5                   10

<210> SEQ ID NO 5
```

<211> LENGTH: 9
<212> TYPE: PRT
<213> ORGANISM: Artificial Sequence
<220> FEATURE:
<223> OTHER INFORMATION: Synthetic B10 VL-CDR1

<400> SEQUENCE: 5

Ser Ser Asp Val Gly Gly Tyr Asn Tyr
1               5

<210> SEQ ID NO 6
<211> LENGTH: 3
<212> TYPE: PRT
<213> ORGANISM: Artificial Sequence
<220> FEATURE:
<223> OTHER INFORMATION: Synthetic B10 VL-CDR2

<400> SEQUENCE: 6

Tyr Asp Ser
1

<210> SEQ ID NO 7
<211> LENGTH: 10
<212> TYPE: PRT
<213> ORGANISM: Artificial Sequence
<220> FEATURE:
<223> OTHER INFORMATION: Synthetic B10 VL-CDR3

<400> SEQUENCE: 7

Ser Ser Tyr Thr Asp Tyr Ser Thr Arg Val
1               5                   10

<210> SEQ ID NO 8
<211> LENGTH: 119
<212> TYPE: PRT
<213> ORGANISM: Artificial Sequence
<220> FEATURE:
<223> OTHER INFORMATION: Synthetic B10 native VH

<400> SEQUENCE: 8

Glu Val Gln Leu Val Glu Ser Gly Gly Ser Leu Val Lys Pro Gly Gly
1               5                   10                  15

Ser Leu Arg Leu Ser Cys Ala Ala Ser Gly Phe Thr Phe Ser Asn Tyr
            20                  25                  30

Asn Met Asn Trp Val Arg Gln Ala Pro Gly Lys Gly Leu Glu Trp Ile
        35                  40                  45

Ser Asp Ile Asn Gly Ser Ser Arg Ser Ile Tyr Tyr Ala Asp Phe Val
    50                  55                  60

Lys Gly Arg Phe Thr Ile Ser Arg Asp Asn Ala Thr Asn Ser Leu Tyr
65                  70                  75                  80

Leu Gln Met Asn Ser Leu Arg Ala Glu Asp Thr Ala Val Tyr Tyr Cys
                85                  90                  95

Val Arg Ser Ser Tyr Tyr Gly Gly Met Asp Val Trp Gly Arg Gly
            100                 105                 110

Thr Leu Val Thr Val Ser Ser
        115

<210> SEQ ID NO 9
<211> LENGTH: 119
<212> TYPE: PRT
<213> ORGANISM: Artificial Sequence
<220> FEATURE:
<223> OTHER INFORMATION: Synthetic B10 derivative VH

```
<400> SEQUENCE: 9

Glu Val Gln Leu Val Glu Ser Gly Gly Ser Leu Val Lys Pro Gly Gly
1               5                   10                  15

Ser Leu Arg Leu Ser Cys Ala Ala Ser Gly Phe Thr Phe Ser Asn Tyr
            20                  25                  30

Asn Met Asn Trp Val Arg Gln Ala Pro Gly Lys Gly Leu Glu Trp Ile
        35                  40                  45

Ser Asp Ile Asn Gly Ala Ser Arg Ser Ile Tyr Tyr Ala Asp Phe Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Val Arg Ser Ser Tyr Tyr Gly Gly Gly Met Asp Val Trp Gly Arg Gly
            100                 105                 110

Thr Leu Val Thr Val Ser Ser
        115

<210> SEQ ID NO 10
<211> LENGTH: 111
<212> TYPE: PRT
<213> ORGANISM: Artificial Sequence
<220> FEATURE:
<223> OTHER INFORMATION: Synthetic B10 VL

<400> SEQUENCE: 10

Gln Ser Val Leu Thr Gln Pro Ala Ser Val Ser Gly Ser Pro Gly Gln
1               5                   10                  15

Ser Ile Thr Ile Ser Cys Ala Gly Thr Ser Ser Asp Val Gly Gly Tyr
            20                  25                  30

Asn Tyr Val Ser Trp Tyr Gln Gln His Pro Gly Lys Ala Pro Lys Leu
        35                  40                  45

Met Ile Tyr Tyr Asp Ser Tyr Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Tyr Thr Asp Tyr
                85                  90                  95

Ser Thr Arg Val Phe Gly Gly Gly Thr Lys Leu Ala Val Leu Gly
            100                 105                 110
```